(12) United States Patent
Lang et al.

(10) Patent No.: US 11,839,338 B2
(45) Date of Patent: Dec. 12, 2023

(54) FLUID DISPENSER WITH WAKE UP SENSOR

(71) Applicant: OP-Hygiene IP GmbH, Niederbipp (CH)

(72) Inventors: Albrecht Lang, Niederbipp (CH); Adrian Senn, Fraubrunnen (CH); Michael Müller, Kestenholz (CH)

(73) Assignee: OP-Hygiene IP GMBH, Niederbipp (CH)

( * ) Notice: Subject to any disclaimer, the term of this patent is extended or adjusted under 35 U.S.C. 154(b) by 0 days.

(21) Appl. No.: 17/843,765

(22) Filed: Jun. 17, 2022

(65) Prior Publication Data

US 2022/0313028 A1 Oct. 6, 2022

Related U.S. Application Data

(63) Continuation of application No. 17/097,034, filed on Nov. 13, 2020, now Pat. No. 11,389,035.

(60) Provisional application No. 62/935,809, filed on Nov. 15, 2019.

(51) Int. Cl.
*A47K 5/12* (2006.01)
*G01J 1/42* (2006.01)

(52) U.S. Cl.
CPC .......... *A47K 5/1217* (2013.01); *A47K 5/1205* (2013.01); *G01J 1/4204* (2013.01)

(58) Field of Classification Search
CPC .... A47K 5/1217; A47K 5/1205; G01J 1/4204
See application file for complete search history.

(56) References Cited

U.S. PATENT DOCUMENTS

| 4,722,372 A * | 2/1988 | Hoffman | A47K 5/1214 250/221 |
| 6,209,751 B1 * | 4/2001 | Goodin | A47K 5/1217 222/52 |
| 2008/0185399 A1 * | 8/2008 | Yang | A47K 5/1217 222/52 |
| 2010/0117836 A1 * | 5/2010 | Seyed Momen | G16H 40/20 340/573.1 |
| 2010/0230435 A1 * | 9/2010 | Wegelin | G07F 13/025 340/5.82 |
| 2019/0147731 A1 * | 5/2019 | Herdt | A47K 5/1217 340/573.1 |

* cited by examiner

*Primary Examiner* — Donnell A Long
(74) *Attorney, Agent, or Firm* — Thorpe North & Western, LLP; Peter M. de Jonge; Kurt Hendricks

(57) ABSTRACT

A fluid dispenser with a pump mechanism that dispenses fluid when activated. A light sensor detects light in or around the fluid dispenser, and a controller controls a function of an electronic component of the fluid dispenser based on detection data received from the light sensor.

19 Claims, 15 Drawing Sheets

FLUID DISPENSER WITH WAKE UP SENSOR

CROSS-REFERENCE TO RELATED APPLICATION

This application claims the benefit of the Nov. 15, 2019 filing date of U.S. Provisional Patent Application No. 62/935,809, which is incorporated herein by reference.

FIELD OF THE INVENTION

This invention relates to hand cleaning fluid dispensers, and more particularly to dispensers that have electronic components requiring electrical energy to operate.

BACKGROUND OF THE INVENTION

Hand cleaning fluid dispensers that have electronic components requiring electrical energy to operate are well known. For example, it is known to provide a fluid dispenser with components such as a counter that detects when the fluid dispenser is activated; a processor that processes data received from other components such as the counter; a memory that stores information; and a communication device such as a wireless transmitter that transmits data to an external server. To power these electronic components, fluid dispensers are often provided with a replaceable battery that comes pre-installed in the dispenser.

The inventors of the present invention have appreciated the disadvantage that some electronic components of fluid dispensers require a significant amount of energy in order to operate. The inventors have further appreciated the disadvantage that electronic components may continue to draw energy from a power source even when the fluid dispenser is not in use. As a result, a built-in power source such as a replaceable battery may disadvantageously rapidly become depleted.

SUMMARY OF THE INVENTION

To at least partially overcome some of the disadvantages of previously known methods and devices, the present invention provides a fluid dispenser having a light sensor that detects light in or around the fluid dispenser, and a controller that controls a function of an electronic component of the fluid dispenser based on detection data received from the light sensor. The inventors have appreciated that detecting light in or around the fluid dispenser can provide useful information about the fluid dispenser, and that this information can be used to control the operation of one or more electronic components. For example, if there is a very low level of ambient light in or around the fluid dispenser, this may indicate that the dispenser is in storage, such as in a package waiting to be shipped to a customer. When the dispenser is in storage, many of the functions provided by the electronic components of the dispenser are not needed. To save energy, the controller can thus set one or more of the electronic components to an inactive or energy-saving mode, in which the components draw little or no energy from a power source such as a built-in battery. When the dispenser is later removed from the package, the amount of ambient light in or around the dispenser increases, and this increase in ambient light is detected by the light sensor. The controller can then activate any of the electronic components whose functionality may be required now that the dispenser is no longer in storage.

The light sensor can also be used to determine whether it is daytime or nighttime, or whether the fluid dispenser is in an illuminated environment or a darkened environment. In many environments in which a fluid dispenser may be installed, such as in an office building, there may be significantly reduced use of the fluid dispenser during the night in comparison to the day. As such, there may be a reduced need for the functionality of one or more of the electronic components at night, and the controller can therefore save energy by setting those components to a nighttime mode having reduced energy consumption.

The inventors have also appreciated that the light sensor can be used to detect a change in the position of a movable component of the dispenser. For example, the light sensor can be arranged to detect light that is reflected from the surface of an actuator plate that moves when the fluid dispenser is activated. A change in the amount of light that is detected by the light sensor can thus be used as an indication that the fluid dispenser has been activated, and the controller can use this information to control the operation of one or more electronic components of the dispenser. For example, for components whose functionality is only required when the dispenser is activated, to save energy the controller can set those components to an inactive or energy-saving mode whenever the dispenser is not in use. When a user activates the dispenser, for example by pressing a manually operated actuator lever or the like, the activation is detected by the light sensor and the controller can then activate the components whose functionality is required when the dispenser is activated.

The inventors have further appreciated that it may be advantageous for a fluid dispenser to be capable of determining the amount of fluid that has been dispensed from the dispenser. For example, for some manually operated fluid dispensers, the amount of fluid that is dispensed when the dispenser is activated may vary depending on the relative extent that a user moves the actuation mechanism, such as an actuator lever or the like. As such, merely counting the activations of the dispenser may not provide an accurate indication of the amount of fluid that has been dispensed or the amount of fluid remaining within the dispenser.

To more accurately determine the amount of fluid that has been dispensed, a pump position sensor can be provided that senses a property of the fluid dispenser that is indicative of a position of a pump mechanism of the dispenser, such as a piston pump. For example, the pump position sensor may be configured to detect the position of a movable component of the dispenser, such as an actuator plate, that changes position when the pump mechanism is activated. The change in position of the movable component can be used to calculate or estimate the change in position of the pump mechanism, which can in turn be used to calculate the amount of fluid that has been dispensed from the pump mechanism.

In a preferred embodiment, the pump position sensor comprises a first magnet sensor and a second magnetic sensor that are arranged to detect the magnetic field of a magnet that is attached to the movable component of the fluid dispenser, such as the actuator plate. Preferably, the first magnetic sensor has a different orientation than the second magnetic sensor, so that the two sensors provide different perspectives on the magnetic field of the magnet. The first magnetic sensor may, for example, be oriented 90 degrees relative to the second magnetic sensor. The inventors have appreciated that using two magnetic sensors with different orientations allows the position of the magnet, and thus the position of the movable component, to be determined with time, which can in turn be used to calculate the amount of fluid that has been dispensed from the pump mechanism with time.

The inventors have further appreciated that the function of the two magnetic sensors would normally only be required when the dispenser has been activated. Furthermore, the two magnetic sensors may, in some embodiments of the invention, consume a relatively large amount of energy while activated. As such, to save energy, the controller preferably sets the two magnetic sensors to an inactive mode whenever the dispenser is not in use. When a user activates the dispenser, for example by pressing a manually operated actuator lever or the like, the activation is detected by the light sensor as described above, and the controller can then activate the two magnetic sensors so that the positions of the movable component can be determined with time, and the amount of fluid dispensed during the activation can be calculated. Calculating the amount of fluid that has been dispensed may be used, for example, to provide an indication to the user, such as by illuminating an LED, when a sufficient dose of fluid has been dispensed in compliance with a preset hand hygiene protocol.

The inventors have appreciated that light sensors that are suitable for implementing the present invention may be relatively inexpensive and may require relatively little electrical energy to operate. As such, the use of light sensors for the purpose of waking up other electronic components in a fluid dispenser only when those components are needed preferably helps to reduce the energy consumption of the dispenser, thereby preferably extending the lifetime of a built-in power source such as a battery.

Accordingly, in a first aspect the present invention resides in a fluid dispenser comprising: a pump mechanism that dispenses fluid when activated; a light sensor that detects light in or around the fluid dispenser; and a controller that controls a function of one or more electronic components of the fluid dispenser based on detection data received from the light sensor.

In a second aspect the present invention resides in a fluid dispenser, which optionally incorporates one or more features of the first aspect, wherein the light sensor measures an intensity of ambient light in or around the fluid dispenser; and wherein the controller sets a mode of operation of the one or more electronic components based on the intensity of ambient light measured by the light sensor.

In a third aspect the present invention resides in a fluid dispenser, which optionally incorporates one or more features of one or more of the first and second aspects, wherein the controller determines whether the fluid dispenser is located in an environment that is illuminated or darkened based on the intensity of ambient light in or around the fluid dispenser; wherein, when the controller determines that the environment is illuminated, the controller controls the one or more electronic components to operate in an active mode; wherein, when the controller determines that the environment is darkened, the controller controls the one or more electronic components to operate in an energy-saving mode; and wherein the one or more electronic components use more energy when in the active mode than when in the energy-saving mode.

In a fourth aspect the present invention resides in a fluid dispenser, which optionally incorporates one or more features of one or more of the first to third aspects, wherein the one or more electronic components comprise the light sensor; wherein the light sensor measures the intensity of ambient light in or around the fluid dispenser at a rate of measurement over time; wherein the controller sets the rate of measurement of the light sensor based on the intensity of ambient light measured by the light sensor; wherein, when the controller determines that the environment is illuminated, the controller controls the light sensor to operate in the active mode; wherein, when the controller determines that the environment is darkened, the controller controls the light sensor to operate in the energy-saving mode; and wherein the rate of measurement of the light sensor is higher when in the active mode than when in the energy-saving mode.

In a fifth aspect the present invention resides in a fluid dispenser, which optionally incorporates one or more features of one or more of the first to fourth aspects, wherein the fluid dispenser has a movable component that moves when the pump mechanism is activated; wherein the fluid dispenser comprises a light emitter that emits light; wherein the light sensor detects movement of the movable component by detecting changes in an amount of the light emitted by the light emitter that is reflected from the movable component towards the light sensor; and wherein the controller determines whether the pump mechanism has been activated based the detection data received from the light sensor.

In a sixth aspect the present invention resides in a fluid dispenser, which optionally incorporates one or more features of one or more of the first to fifth aspects, wherein the controller controls the function of at least one of the one or more electronic components based on at least one of: the determination as to whether the pump mechanism has been activated; and a length of time that has passed since the pump mechanism was last activated.

In a seventh aspect the present invention resides in a fluid dispenser, which optionally incorporates one or more features of one or more of the first to sixth aspects, wherein the at least one of the one or more electronic components comprises a pump position sensor that senses a property of the fluid dispenser that is indicative of a position of the pump mechanism; and wherein the controller controls the function of the pump position sensor based on the determination as to whether the pump mechanism has been activated.

In an eighth aspect the present invention resides in a fluid dispenser, which optionally incorporates one or more features of one or more of the first to seventh aspects, wherein, when the controller determines that the pump mechanism has been activated, the controller activates the pump position sensor.

In a ninth aspect the present invention resides in a fluid dispenser, which optionally incorporates one or more features of one or more of the first to eighth aspects, wherein, when the controller determines that the pump mechanism has been inactive for a set period of time, the controller inactivates the pump position sensor.

In a tenth aspect the present invention resides in a fluid dispenser, which optionally incorporates one or more features of one or more of the first to ninth aspects, wherein the controller receives sensor data from the pump position sensor and determines the position of the pump mechanism over time based on the sensor data; and wherein the controller calculates or estimates a volume of the fluid that has been dispensed from the fluid dispenser over time based on the position of the pump mechanism over time.

In an eleventh aspect the present invention resides in a fluid dispenser, which optionally incorporates one or more features of one or more of the first to tenth aspects, wherein the controller compares the volume of the fluid that has been dispensed from the fluid dispenser during an activation event to a threshold volume, and determines whether the volume of the fluid dispensed during the activation event is equal to or greater than the threshold volume; the fluid dispenser further comprising an indicator that provides an indication to a user when the volume of the fluid dispensed during the activation event is equal to or greater than the threshold volume.

In a twelfth aspect the present invention resides in a fluid dispenser, which optionally incorporates one or more features of one or more of the first to eleventh aspects, further comprising a magnet that moves relative to the pump position sensor when the pump mechanism is activated; wherein the pump position sensor comprises a first magnet sensor that is oriented in a first orientation and a second magnet sensor that is oriented in a second orientation, the first orientation being different than the second orientation; wherein the first magnet sensor and the second magnet sensor detect a position of the magnet over time; and wherein the controller receives the sensor data from the first magnet sensor and the second magnet sensor and determines the position of the pump mechanism over time based on the sensor data.

In a thirteenth aspect the present invention resides in a fluid dispenser, which optionally incorporates one or more features of one or more of the first to twelfth aspects, wherein the movable component comprises an actuator that engages with the pump mechanism to activate the pump mechanism; wherein the magnet is attached to the actuator; and wherein the light sensor detects light reflected from the actuator.

In a fourteenth aspect the present invention resides in a fluid dispenser, which optionally incorporates one or more features of one or more of the first to thirteenth aspects, further comprising a removable cover that is positioned adjacent to the actuator, the removable cover carrying the light sensor, the first magnet sensor, the second magnet sensor, the controller, and a battery that provides energy to the controller, the light sensor, the first magnet sensor, and the second magnet sensor; wherein the fluid dispenser is a hand cleaning fluid dispenser and the fluid is a hand cleaning fluid.

In a fifteenth aspect the present invention resides in a fluid dispenser, which optionally incorporates one or more features of one or more of the first to fourteenth aspects, further comprising a communication device that is operable to communicate with a mobile device carried by a user; wherein the controller is configured to set the threshold volume or update the threshold volume based on user data received by the communication device from the mobile device.

In a sixteenth aspect the present invention resides in a fluid dispenser, which optionally incorporates one or more features of one or more of the first to fifteenth aspects, wherein the fluid dispenser has a movable component that moves when the pump mechanism is activated; wherein the fluid dispenser comprises a light emitter that emits light; wherein the light sensor detects movement of the movable component by detecting changes in an amount of the light emitted by the light emitter that is reflected from the movable component towards the light sensor; and wherein the controller determines whether the pump mechanism has been activated based the detection data received from the light sensor.

In a seventeenth aspect the present invention resides in a fluid dispenser, which optionally incorporates one or more features of one or more of the first to sixteenth aspects, wherein the fluid dispenser has a movable component that moves when the pump mechanism is activated; wherein the fluid dispenser comprises a light emitter that emits light; wherein the light sensor detects movement of the movable component by detecting changes in an amount of the light emitted by the light emitter that is reflected from the movable component towards the light sensor; and wherein the controller determines whether the pump mechanism has been activated based the detection data received from the light sensor.

In an eighteenth aspect the present invention resides in a fluid dispenser, which optionally incorporates one or more features of one or more of the first to seventeenth aspects, wherein the controller controls the function of at least one of the one or more electronic components based on at least one of: the determination as to whether the pump mechanism has been activated; and a length of time that has passed since the pump mechanism was last activated; wherein the at least one of the one or more electronic components comprises a pump position sensor that senses a property of the fluid dispenser that is indicative of a position of the pump mechanism; wherein the controller controls the function of the pump position sensor based on the determination as to whether the pump mechanism has been activated; wherein, when the controller determines that the pump mechanism has been activated, the controller activates the pump position sensor; wherein, when the controller determines that the pump mechanism has been inactive for a set period of time, the controller inactivates the pump position sensor; wherein the controller receives sensor data from the pump position sensor and determines the position of the pump mechanism over time based on the sensor data; and wherein the controller calculates or estimates a volume of the fluid that has been dispensed from the fluid dispenser over time based on the position of the pump mechanism over time.

In a nineteenth aspect the present invention resides in a fluid dispenser, which optionally incorporates one or more features of one or more of the first to eighteenth aspects, wherein the controller compares the volume of the fluid that has been dispensed from the fluid dispenser during an activation event to a threshold volume, and determines whether the volume of the fluid dispensed during the activation event is equal to or greater than the threshold volume; the fluid dispenser further comprising: an indicator that provides an indication to a user when the volume of the fluid dispensed during the activation event is equal to or greater than the threshold volume; and a magnet that moves relative to the pump position sensor when the pump mechanism is activated; wherein the pump position sensor comprises a first magnet sensor that is oriented in a first orientation and a second magnet sensor that is oriented in a second orientation, the first orientation being different than the second orientation; wherein the first magnet sensor and the second magnet sensor detect a position of the magnet over time; and wherein the controller receives the sensor data from the first magnet sensor and the second magnet sensor and determines the position of the pump mechanism over time based on the sensor data.

In a twentieth aspect the present invention resides in a fluid dispenser, which optionally incorporates one or more features of one or more of the first to nineteenth aspects, wherein the movable component comprises an actuator that engages with the pump mechanism to activate the pump mechanism; wherein the magnet is attached to the actuator; wherein the light sensor detects light reflected from the actuator; the fluid dispenser further comprising a removable cover that is positioned adjacent to the actuator, the removable cover carrying the light sensor, the first magnet sensor, the second magnet sensor, the controller, and a battery that provides energy to the controller, the light sensor, the first magnet sensor, and the second magnet sensor; wherein the fluid dispenser is a hand cleaning fluid dispenser and the fluid is a hand cleaning fluid; the fluid dispenser further comprising a communication device that is operable to communicate with a mobile device carried by a user; wherein the controller is configured to set the threshold volume or update the threshold volume based on user data received by the communication device from the mobile device.

In a twenty first aspect the present invention resides in a fluid dispenser, which optionally incorporates one or more features of one or more of the first to twentieth aspects, the fluid dispenser comprising: a pump mechanism that dispenses fluid when activated; a light sensor that detects light in or around the fluid dispenser; and a controller that controls a function of an electronic component of the fluid dispenser based on detection data received from the light sensor.

In a twenty second aspect the present invention resides in a fluid dispenser, which optionally incorporates one or more features of one or more of the first to twenty first aspects, wherein the controller determines whether the fluid dispenser is inside a package or removed from the package based on the detection data received from the light sensor.

In a twenty third aspect the present invention resides in a fluid dispenser, which optionally incorporates one or more features of one or more of the first to twenty second aspects, wherein, when the controller determines that the fluid dispenser is removed from the package, the controller activates the electronic component.

In a twenty fourth aspect the present invention resides in a fluid dispenser, which optionally incorporates one or more features of one or more of the first to twenty third aspects, wherein, when the controller determines that the fluid dispenser is inside the package, the controller controls the electronic component to operate in a packaged mode; wherein, when the controller determines that the fluid dispenser is removed from the package, the controller controls the electronic component to operate in an unpackaged mode; and wherein the electronic component uses more energy when in the unpackaged mode than when in the packaged mode.

In a twenty fifth aspect the present invention resides in a fluid dispenser, which optionally incorporates one or more features of one or more of the first to twenty fourth aspects, wherein the electronic component comprises at least one of: a motion detector; a hand detector; a timer; a counter; a fingerprint reader; a light; a magnetic sensor; a transmitter; a receiver; a communication device; a processor; a sound detector; a camera; a time-of-flight sensor; a position sensor; a proximity sensor; an infrared sensor; and a display.

In a twenty sixth aspect the present invention resides in a fluid dispenser, which optionally incorporates one or more features of one or more of the first to twenty fifth aspects, wherein the light sensor measures an intensity of ambient light in or around the fluid dispenser; and wherein the controller sets a mode of operation of the electronic component based on the intensity of ambient light measured by the light sensor.

In a twenty seventh aspect the present invention resides in a fluid dispenser, which optionally incorporates one or more features of one or more of the first to twenty sixth aspects, wherein the controller determines whether the fluid dispenser is in storage or out of storage based on the intensity of ambient light in or around the fluid dispenser; wherein, when the controller determines that the fluid dispenser is in storage, the controller controls the electronic component to operate in a storage mode; wherein, when the controller determines that the fluid dispenser is out of storage, the controller controls the electronic component to operate in an out of storage mode; and wherein the electronic component uses more energy when in the out of storage mode than when in the storage mode.

In a twenty eighth aspect the present invention resides in a fluid dispenser, which optionally incorporates one or more features of one or more of the first to twenty seventh aspects, wherein the controller determines whether it is night or day based on the intensity of ambient light in or around the fluid dispenser; wherein, when the controller determines that it is night, the controller controls the electronic component to operate in a nighttime mode; wherein, when the controller determines that it is day, the controller controls the electronic component to operate in a daytime mode; and wherein the electronic component uses more energy when in the daytime mode than when in the nighttime mode.

In a twenty ninth aspect the present invention resides in a fluid dispenser, which optionally incorporates one or more features of one or more of the first to twenty eighth aspects, wherein the controller determines whether the fluid dispenser is located in an environment that is illuminated or darkened based on the intensity of ambient light in or around the fluid dispenser; wherein, when the controller determines that the environment is illuminated, the controller controls the electronic component to operate in an active mode; wherein, when the controller determines that the environment is darkened, the controller controls the electronic component to operate in an energy-saving mode; and wherein the electronic component uses more energy when in the active mode than when in the energy-saving mode.

In a thirtieth aspect the present invention resides in a fluid dispenser, which optionally incorporates one or more features of one or more of the first to twenty ninth aspects, wherein the light sensor measures the intensity of ambient light in or around the fluid dispenser at a rate of measurement over time; and wherein the controller sets the rate of measurement of the light sensor based on the intensity of ambient light measured by the light sensor.

In a thirty first aspect the present invention resides in a fluid dispenser, which optionally incorporates one or more features of one or more of the first to thirtieth aspects, wherein, when the controller determines that the environment is illuminated, the controller controls the light sensor to operate in the active mode; wherein, when the controller determines that the environment is darkened, the controller controls the light sensor to operate in the energy-saving mode; and wherein the rate of measurement of the light sensor is higher when in the active mode than when in the energy-saving mode.

In a thirty second aspect the present invention resides in a fluid dispenser, which optionally incorporates one or more features of one or more of the first to thirty first aspects, wherein the fluid dispenser has a movable component that moves when the pump mechanism is activated; wherein the fluid dispenser comprises a light emitter that emits light; wherein the light sensor detects movement of the movable component by detecting changes in an amount of the light emitted by the light emitter that is reflected from the movable component towards the light sensor; and wherein the controller determines whether the pump mechanism has been activated based the detection data received from the light sensor.

In a thirty third aspect the present invention resides in a fluid dispenser, which optionally incorporates one or more features of one or more of the first to thirty second aspects, wherein the controller controls the function of the electronic component based on whether the pump mechanism has been activated.

In a thirty fourth aspect the present invention resides in a fluid dispenser, which optionally incorporates one or more features of one or more of the first to thirty third aspects, wherein the controller controls the function of the electronic component based on a length of time since the pump mechanism was last activated.

In a thirty fifth aspect the present invention resides in a fluid dispenser, which optionally incorporates one or more features of one or more of the first to thirty fourth aspects, further comprising a pump position sensor that senses a property of the fluid dispenser that is indicative of a position of the pump mechanism; wherein the controller controls the pump position sensor based on whether the pump mechanism has been activated.

In a thirty sixth aspect the present invention resides in a fluid dispenser, which optionally incorporates one or more features of one or more of the first to thirty fifth aspects, wherein, when the controller determines that the pump mechanism has been activated, the controller activates the pump position sensor.

In a thirty seventh aspect the present invention resides in a fluid dispenser, which optionally incorporates one or more features of one or more of the first to thirty sixth aspects, wherein, when the controller determines that the pump mechanism has been inactive for a set period of time, the controller inactivates the pump position sensor.

In a thirty eighth aspect the present invention resides in a fluid dispenser, which optionally incorporates one or more features of one or more of the first to thirty seventh aspects, further comprising a data processor that receives sensor data from the pump position sensor and determines the position of the pump mechanism over time based on the sensor data.

In a thirty ninth aspect the present invention resides in a fluid dispenser, which optionally incorporates one or more features of one or more of the first to thirty eighth aspects, wherein the data processor calculates or estimates a volume of the fluid that has been dispensed from the fluid dispenser over time based on the position of the pump mechanism over time.

In a fortieth aspect the present invention resides in a fluid dispenser, which optionally incorporates one or more features of one or more of the first to thirty ninth aspects, wherein the data processor compares the volume of the fluid that has been dispensed from the fluid dispenser during an activation event to a threshold volume, and determines whether the volume of the fluid dispensed during the activation event exceeds the threshold volume.

In a forty first aspect the present invention resides in a fluid dispenser, which optionally incorporates one or more features of one or more of the first to fortieth aspects, further comprising an indicator that provides an indication to a user when the volume of the fluid dispensed during the activation event exceeds the threshold volume.

In a forty second aspect the present invention resides in a fluid dispenser, which optionally incorporates one or more features of one or more of the first to forty first aspects, further comprising a magnet that moves relative to the pump position sensor when the pump mechanism is activated; wherein the pump position sensor comprises a first magnet sensor that is oriented in a first orientation and a second magnet sensor that is oriented in a second orientation, the first orientation being different than the second orientation; wherein first magnet sensor and the second magnet sensor detect a position of the magnet over time; and wherein the data processor receives the sensor data from the first magnet sensor and the second magnet sensor and determines the position of the pump mechanism over time based on the sensor data.

In a forty third aspect the present invention resides in a fluid dispenser, which optionally incorporates one or more features of one or more of the first to forty second aspects, wherein the second magnet sensor is orientated at 90 degrees relative to the first magnet sensor.

In a forty fourth aspect the present invention resides in a fluid dispenser, which optionally incorporates one or more features of one or more of the first to forty third aspects, further comprising an actuator plate that engages with the pump mechanism to activate the pump mechanism; wherein the magnet is attached to the actuator plate; and wherein the light sensor detects light reflected from the actuator plate.

In a forty fifth aspect the present invention resides in a fluid dispenser, which optionally incorporates one or more features of one or more of the first to forty fourth aspects, further comprising a cover that is positioned adjacent to the actuator plate, the cover carrying the light sensor, the first magnet sensor, and the second magnet sensor.

In a forty sixth aspect the present invention resides in a fluid dispenser, which optionally incorporates one or more features of one or more of the first to forty fifth aspects, wherein the cover also carries the controller and a battery that provides energy to the controller, the light sensor, the first magnet sensor, and the second magnet sensor.

In a forty seventh aspect the present invention resides in a fluid dispenser, which optionally incorporates one or more features of one or more of the first to forty sixth aspects, wherein the cover is removable.

In a forty eighth aspect the present invention resides in a fluid dispenser, which optionally incorporates one or more features of one or more of the first to forty seventh aspects, further comprising a data communication device that is operable to communicate with a mobile communication device carried by a user; wherein, when the controller determines that the pump mechanism has been activated, the controller activates the data communication device.

In a forty ninth aspect the present invention resides in a fluid dispenser, which optionally incorporates one or more features of one or more of the first to forty eighth aspects, wherein the controller is configured to set the threshold volume or update the threshold volume based on user data received by the data communication device from the mobile communication device.

In a fiftieth aspect the present invention resides in a fluid dispenser, which optionally incorporates one or more features of one or more of the first to forty ninth aspects, wherein the fluid dispenser is a hand cleaning fluid dispenser and the fluid is a hand cleaning fluid.

In a fifty first aspect the present invention resides in a smart cover for a fluid dispenser, which optionally incorporates one or more features of one or more of the first to fiftieth aspects, the smart cover comprising: a light sensor that detects light in or around the smart cover; and a controller that controls a function of an electronic component of the smart cover based on detection data received from the light sensor.

In a fifty second aspect the present invention resides in a smart cover, which optionally incorporates one or more features of one or more of the first to fifty first aspects, wherein the controller determines whether the smart cover is inside a package or removed from the package based on the detection data received from the light sensor.

In a fifty third aspect the present invention resides in a smart cover, which optionally incorporates one or more features of one or more of the first to fifty second aspects, wherein, when the controller determines that the smart cover is removed from the package, the controller activates the electronic component.

In a fifty fourth aspect the present invention resides in a smart cover, which optionally incorporates one or more features of one or more of the first to fifty third aspects, wherein, when the controller determines that the smart cover is inside the package, the controller controls the electronic component to operate in a packaged mode; wherein, when the controller determines that the smart cover is removed from the package, the controller controls the electronic component to operate in an unpackaged mode; and wherein the electronic component uses more energy when in the unpackaged mode than when in the packaged mode.

In a fifty fifth aspect the present invention resides in a smart cover, which optionally incorporates one or more features of one or more of the first to fifty fourth aspects, wherein the electronic component comprises at least one of: a motion detector; a hand detector; a timer; a counter; a fingerprint reader; a light; a magnetic sensor; a transmitter; a receiver; a communication device; a processor; a sound detector; a camera; a time-of-flight sensor; a position sensor; a proximity sensor; an infrared sensor; and a display.

In a fifty sixth aspect the present invention resides in a smart cover, which optionally incorporates one or more features of one or more of the first to fifty fifth aspects, wherein the light sensor measures an intensity of ambient light in or around the smart cover; and wherein the controller sets a mode of operation of the electronic component based on the intensity of ambient light measured by the light sensor.

In a fifty seventh aspect the present invention resides in a smart cover, which optionally incorporates one or more features of one or more of the first to fifty sixth aspects, wherein the controller determines whether the smart cover is in storage or out of storage based on the intensity of ambient light in or around the smart cover; wherein, when the controller determines that the smart cover is in storage, the controller controls the electronic component to operate in a storage mode; wherein, when the controller determines that the smart cover is out of storage, the controller controls the electronic component to operate in an out of storage mode; and wherein the electronic component uses more energy when in the out of storage mode than when in the storage mode.

In a fifty eighth aspect the present invention resides in a smart cover, which optionally incorporates one or more features of one or more of the first to fifty seventh aspects, wherein the controller determines whether it is night or day based on the intensity of ambient light in or around the smart cover; wherein, when the controller determines that it is night, the controller controls the electronic component to operate in a nighttime mode; wherein, when the controller determines that it is day, the controller controls the electronic component to operate in a daytime mode; and wherein the electronic component uses more energy when in the daytime mode than when in the nighttime mode.

In a fifty ninth aspect the present invention resides in a smart cover, which optionally incorporates one or more features of one or more of the first to fifty eighth aspects, wherein the controller determines whether the smart cover is located in an environment that is illuminated or darkened based on the intensity of ambient light in or around the smart cover; wherein, when the controller determines that the environment is illuminated, the controller controls the electronic component to operate in an active mode; wherein, when the controller determines that the environment is darkened, the controller controls the electronic component to operate in an energy-saving mode; and wherein the electronic component uses more energy when in the active mode than when in the energy-saving mode.

In a sixtieth aspect the present invention resides in a smart cover, which optionally incorporates one or more features of one or more of the first to fifty ninth aspects, wherein the light sensor measures the intensity of ambient light in or around the smart cover at a rate of measurement over time; and wherein the controller sets the rate of measurement of the light sensor based on the intensity of ambient light measured by the light sensor.

In a sixty first aspect the present invention resides in a smart cover, which optionally incorporates one or more features of one or more of the first to sixtieth aspects, wherein, when the controller determines that the environment is illuminated, the controller controls the light sensor to operate in the active mode; wherein, when the controller determines that the environment is darkened, the controller controls the light sensor to operate in the energy-saving mode; and wherein the rate of measurement of the light sensor is higher when in the active mode than when in the energy-saving mode.

In a sixty second aspect the present invention resides in a smart cover, which optionally incorporates one or more features of one or more of the first to sixty first aspects, wherein the smart cover comprises a light emitter that emits light; wherein the light sensor detects movement of a movable component of the fluid dispenser that moves when a pump mechanism of the fluid dispenser is activated by detecting changes in an amount of the light emitted by the light emitter that is reflected from the movable component towards the light sensor; and wherein the controller determines whether the pump mechanism has been activated based the detection data received from the light sensor.

In a sixty third aspect the present invention resides in a smart cover, which optionally incorporates one or more features of one or more of the first to sixty second aspects, wherein the controller controls the function of the electronic component based on whether the pump mechanism has been activated.

In a sixty fourth aspect the present invention resides in a smart cover, which optionally incorporates one or more features of one or more of the first to sixty third aspects, wherein the controller controls the function of the electronic component based on a length of time since the pump mechanism was last activated.

In a sixty fifth aspect the present invention resides in a smart cover, which optionally incorporates one or more features of one or more of the first to sixty fourth aspects, further comprising a pump position sensor that senses a property of the fluid dispenser that is indicative of a position of the pump mechanism; wherein the controller controls the pump position sensor based on whether the pump mechanism has been activated.

In a sixty sixth aspect the present invention resides in a smart cover, which optionally incorporates one or more features of one or more of the first to sixty fifth aspects, wherein, when the controller determines that the pump mechanism has been activated, the controller activates the pump position sensor.

In a sixty seventh aspect the present invention resides in a smart cover, which optionally incorporates one or more features of one or more of the first to sixty sixth aspects, wherein, when the controller determines that the pump mechanism has been inactive for a set period of time, the controller inactivates the pump position sensor.

In a sixty eighth aspect the present invention resides in a smart cover, which optionally incorporates one or more features of one or more of the first to sixty seventh aspects, further comprising a data processor that receives sensor data from the pump position sensor and determines the position of the pump mechanism over time based on the sensor data.

In a sixty ninth aspect the present invention resides in a smart cover, which optionally incorporates one or more features of one or more of the first to sixty eighth aspects, wherein the data processor calculates or estimates a volume of fluid that has been dispensed from the fluid dispenser over time based on the position of the pump mechanism over time.

In a seventieth aspect the present invention resides in a smart cover, which optionally incorporates one or more features of one or more of the first to sixty ninth aspects, wherein the data processor compares the volume of fluid that has been dispensed from the fluid dispenser during an activation event to a threshold volume, and determines whether the volume of fluid dispensed during the activation event exceeds the threshold volume.

In a seventy first aspect the present invention resides in a smart cover, which optionally incorporates one or more features of one or more of the first to seventieth aspects, further comprising an indicator that provides an indication to a user when the volume of fluid dispensed during the activation event exceeds the threshold volume.

In a seventy second aspect the present invention resides in a smart cover, which optionally incorporates one or more features of one or more of the first to seventy first aspects, wherein the pump position sensor comprises a first magnet sensor that is oriented in a first orientation and a second magnet sensor that is oriented in a second orientation, the first orientation being different than the second orientation; wherein first magnet sensor and the second magnet sensor detect a position of a magnet that moves relative to the smart cover when the pump mechanism is activated; and wherein the data processor receives the sensor data from the first magnet sensor and the second magnet sensor and determines the position of the pump mechanism over time based on the sensor data.

In a seventy third aspect the present invention resides in a smart cover, which optionally incorporates one or more features of one or more of the first to seventy second aspects, wherein the second magnet sensor is orientated at 90 degrees relative to the first magnet sensor.

In a seventy fourth aspect the present invention resides in a smart cover, which optionally incorporates one or more features of one or more of the first to seventy third aspects, wherein the light sensor detects light reflected from an actuator plate that carries the magnet and engages with the pump mechanism to activate the pump mechanism.

In a seventy fifth aspect the present invention resides in a smart cover, which optionally incorporates one or more features of one or more of the first to seventy fourth aspects, wherein the smart cover is positioned adjacent to the actuator plate.

In a seventy sixth aspect the present invention resides in a smart cover, which optionally incorporates one or more features of one or more of the first to seventy fifth aspects, further comprising a battery that provides energy to the controller, the light sensor, the first magnet sensor, and the second magnet sensor.

In a seventy seventh aspect the present invention resides in a smart cover, which optionally incorporates one or more features of one or more of the first to seventy sixth aspects, wherein the smart cover is removable from the fluid dispenser.

In a seventy eighth aspect the present invention resides in a smart cover, which optionally incorporates one or more features of one or more of the first to seventy seventh aspects, further comprising a data communication device that is operable to communicate with a mobile communication device carried by a user; wherein, when the controller determines that the pump mechanism has been activated, the controller activates the data communication device.

In a seventy ninth aspect the present invention resides in a smart cover, which optionally incorporates one or more features of one or more of the first to seventy eighth aspects, wherein the controller is configured to set the threshold volume or update the threshold volume based on user data received by the data communication device from the mobile communication device.

In an eightieth aspect the present invention resides in a smart cover, which optionally incorporates one or more features of one or more of the first to seventy ninth aspects, wherein the smart cover is a cover for a hand cleaning fluid dispenser that dispenses a hand cleaning fluid.

In an eighty first aspect the present invention resides in a method of operating a fluid dispenser, which optionally incorporates one or more features of one or more of the first to eightieth aspects, the method comprising: detecting light in or around the fluid dispenser using a light sensor; and controlling a function of an electronic component of the fluid dispenser based on detection data received from the light sensor.

In an eighty second aspect the present invention resides in a method, which optionally incorporates one or more features of one or more of the first to eighty first aspects, further comprising determining whether the fluid dispenser is inside a package or removed from the package based on the detection data received from the light sensor.

In an eighty third aspect the present invention resides in a method, which optionally incorporates one or more features of one or more of the first to eighty second aspects, further comprising activating the electronic component when it is determined that the fluid dispenser is removed from the package.

In an eighty fourth aspect the present invention resides in a method, which optionally incorporates one or more features of one or more of the first to eighty third aspects, further comprising: controlling the electronic component to operate in a packaged mode when it is determined that the fluid dispenser is inside the package; and controlling the electronic component to operate in a unpackaged mode when it is determined that the fluid dispenser is removed from the package; wherein the electronic component uses more energy when in the unpackaged mode than when in the packaged mode.

In an eighty fifth aspect the present invention resides in a method, which optionally incorporates one or more features of one or more of the first to eighty fourth aspects, wherein the electronic component comprises at least one of: a motion detector; a hand detector; a timer; a counter; a fingerprint reader; a light; a magnetic sensor; a transmitter; a receiver; a communication device; a processor; a sound detector; a camera; a time-of-flight sensor; a position sensor; a proximity sensor; an infrared sensor; and a display.

In an eighty sixth aspect the present invention resides in a method, which optionally incorporates one or more features of one or more of the first to eighty fifth aspects, wherein detecting light in or around the fluid dispenser using the light sensor comprises measuring an intensity of ambient light in or around the fluid dispenser; and wherein controlling the function of the electronic component of the fluid dispenser comprises setting a mode of operation of the electronic component based on the intensity of ambient light measured by the light sensor.

In an eighty seventh aspect the present invention resides in a method, which optionally incorporates one or more features of one or more of the first to eighty sixth aspects, further comprising: determining whether the fluid dispenser is in storage or out of storage based on the intensity of ambient light in or around the fluid dispenser; controlling the electronic component to operate in a storage mode when it is determined that the fluid dispenser is in storage; and controlling the electronic component to operate in an out of storage mode when it is determined that the fluid dispenser is out of storage; wherein the electronic component uses more energy when in the out of storage mode than when in the storage mode.

In an eighty eighth aspect the present invention resides in a method, which optionally incorporates one or more features of one or more of the first to eighty seventh aspects, further comprising: determining whether it is night or day based on the intensity of ambient light in or around the fluid dispenser; controlling the electronic component to operate in a nighttime mode when it is determined that it is night; and controlling the electronic component to operate in a daytime mode when it is determined that it is day; wherein the electronic component uses more energy when in the daytime mode than when in the nighttime mode.

In an eighty ninth aspect the present invention resides in a method, which optionally incorporates one or more features of one or more of the first to eighty eighth aspects, further comprising: determining whether the fluid dispenser is located in an environment that is illuminated or darkened based on the intensity of ambient light in or around the fluid dispenser; controlling the electronic component to operate in an active mode when it is determined that the environment is illuminated; and controlling the electronic component to operate in an energy-saving mode when it is determined that the environment is darkened; wherein the electronic component uses more energy when in the active mode than when in the energy-saving mode.

In a ninetieth aspect the present invention resides in a method, which optionally incorporates one or more features of one or more of the first to eighty ninth aspects, wherein the light sensor measures the intensity of ambient light in or around the fluid dispenser at a rate of measurement over time; the method further comprising setting the rate of measurement of the light sensor based on the intensity of ambient light measured by the light sensor.

In a ninety first aspect the present invention resides in a method, which optionally incorporates one or more features of one or more of the first to ninetieth aspects, wherein controlling the electronic component to operate in the active mode when it is determined that the environment is illuminated comprises controlling the light sensor to operate in the active mode when it is determined that the environment is illuminated; wherein controlling the electronic component to operate in the energy-saving mode when it is determined that the environment is darkened comprises controlling the light sensor to operate in the energy-saving mode when it is determined that the environment is darkened; and wherein the rate of measurement of the light sensor is higher when in the active mode than when in the energy-saving mode.

In a ninety second aspect the present invention resides in a method, which optionally incorporates one or more features of one or more of the first to ninety first aspects, wherein the fluid dispenser has a movable component that moves when a pump mechanism of the fluid dispenser is activated to dispense fluid; and wherein the fluid dispenser has a light emitter; the method further comprising: emitting light from the light emitter; detecting movement of the movable component using the light sensor by detecting changes in an amount of the light emitted by the light emitter that is reflected from the movable component towards the light sensor; and determining whether the pump mechanism has been activated based the detection data received from the light sensor.

In a ninety third aspect the present invention resides in a method, which optionally incorporates one or more features of one or more of the first to ninety second aspects, wherein controlling the function of the electronic component of the fluid dispenser based on the detection data received from the light sensor comprises controlling the function of the electronic component based on whether the pump mechanism has been activated.

In a ninety fourth aspect the present invention resides in a method, which optionally incorporates one or more features of one or more of the first to ninety third aspects, wherein controlling the function of the electronic component of the fluid dispenser based on the detection data received from the light sensor comprises controlling the function of the electronic component based on a length of time since the pump mechanism was last activated.

In a ninety fifth aspect the present invention resides in a method, which optionally incorporates one or more features of one or more of the first to ninety fourth aspects, further comprising: sensing a property of the fluid dispenser that is indicative of a position of the pump mechanism using a pump position sensor; and controlling the pump position sensor based on whether the pump mechanism has been activated.

In a ninety sixth aspect the present invention resides in a method, which optionally incorporates one or more features of one or more of the first to ninety fifth aspects, wherein controlling the pump position sensor based on whether the pump mechanism has been activated comprises activating the pump position sensor when the controller determines that the pump mechanism has been activated.

In a ninety seventh aspect the present invention resides in a method, which optionally incorporates one or more features of one or more of the first to ninety sixth aspects, wherein controlling the pump position sensor based on whether the pump mechanism has been activated comprises inactivating the pump position sensor when the controller determines that the pump mechanism has been inactive for a set period of time.

In a ninety eighth aspect the present invention resides in a method, which optionally incorporates one or more features of one or more of the first to ninety seventh aspects, further comprising determining the position of the pump mechanism over time based on sensor data from the pump position sensor.

In a ninety ninth aspect the present invention resides in a method, which optionally incorporates one or more features of one or more of the first to ninety eighth aspects, further comprising calculating or estimating a volume of fluid that has been dispensed from the fluid dispenser over time based on the position of the pump mechanism over time.

In a hundredth aspect the present invention resides in a method, which optionally incorporates one or more features of one or more of the first to ninety ninth aspects, further comprising: comparing the volume of fluid that has been dispensed from the fluid dispenser during an activation event to a threshold volume; and determining whether the volume of fluid dispensed during the activation event exceeds the threshold volume.

In a hundred and first aspect the present invention resides in a method, which optionally incorporates one or more features of one or more of the first to hundredth aspects, further comprising providing an indication to a user when the volume of fluid dispensed during the activation event exceeds the threshold volume.

In a hundred and second aspect the present invention resides in a method, which optionally incorporates one or more features of one or more of the first to hundred and first aspects, wherein the fluid dispenser further comprises a magnet that moves relative to the pump position sensor when the pump mechanism is activated; wherein the pump position sensor comprises a first magnet sensor that is oriented in a first orientation and a second magnet sensor that is oriented in a second orientation, the first orientation being different than the second orientation; the method further comprising detecting a position of the magnet over time using the first magnet sensor and the second magnet sensor; and wherein determining the position of the pump mechanism over time comprises determining the position of the pump mechanism over time based on the sensor data from the first magnet sensor and the second magnet sensor.

In a hundred and third aspect the present invention resides in a method, which optionally incorporates one or more features of one or more of the first to hundred and second aspects, further comprising orienting the second magnet sensor at 90 degrees relative to the first magnet sensor.

In a hundred and fourth aspect the present invention resides in a method, which optionally incorporates one or more features of one or more of the first to hundred and third aspects, wherein the fluid dispenser further comprises an actuator plate that engages with the pump mechanism to activate the pump mechanism; wherein the magnet is attached to the actuator plate; and wherein detecting light in or around the fluid dispenser using the light sensor comprises detecting light reflected from the actuator plate.

In a hundred and fifth aspect the present invention resides in a method, which optionally incorporates one or more features of one or more of the first to hundred and fourth aspects, further comprising positioning a cover of the fluid dispenser adjacent to the actuator plate, the cover carrying the light sensor, the first magnet sensor, and the second magnet sensor.

In a hundred and sixth aspect the present invention resides in a method, which optionally incorporates one or more features of one or more of the first to hundred and fifth aspects, further comprising providing the cover with a battery to provide energy to the controller, the light sensor, the first magnet sensor, and the second magnet sensor.

In a hundred and seventh aspect the present invention resides in a method, which optionally incorporates one or more features of one or more of the first to hundred and sixth aspects, further comprising removing the cover.

In a hundred and eighth aspect the present invention resides in a method, which optionally incorporates one or more features of one or more of the first to hundred and seventh aspects, wherein the fluid dispenser further comprises a data communication device that is operable to communicate with a mobile communication device carried by a user; the method further comprising activating the data communication device when the controller determines that the pump mechanism has been activated.

In a hundred and ninth aspect the present invention resides in a method, which optionally incorporates one or more features of one or more of the first to hundred and eighth aspects, further comprising setting the threshold volume or updating the threshold volume based on user data received by the data communication device from the mobile communication device.

In a hundred and tenth aspect the present invention resides in a method, which optionally incorporates one or more features of one or more of the first to hundred and ninth aspects, wherein the fluid dispenser is a hand cleaning fluid dispenser for dispensing a hand cleaning fluid.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
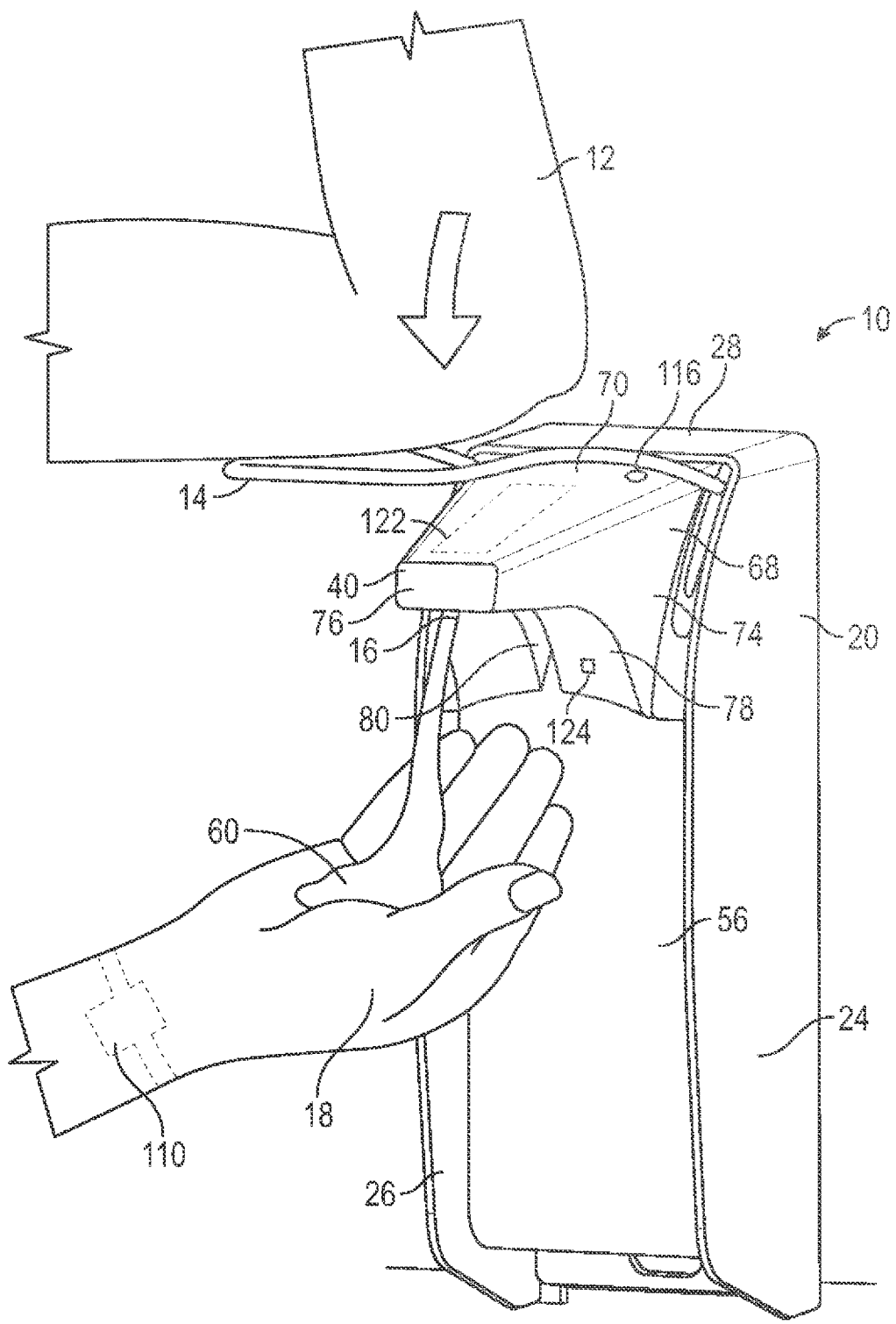
FIG. 1 is a perspective view of a fluid dispenser in accordance with a first embodiment of the invention shown as being manually used by a user to dispense a hand cleaning fluid.
Figure 2:
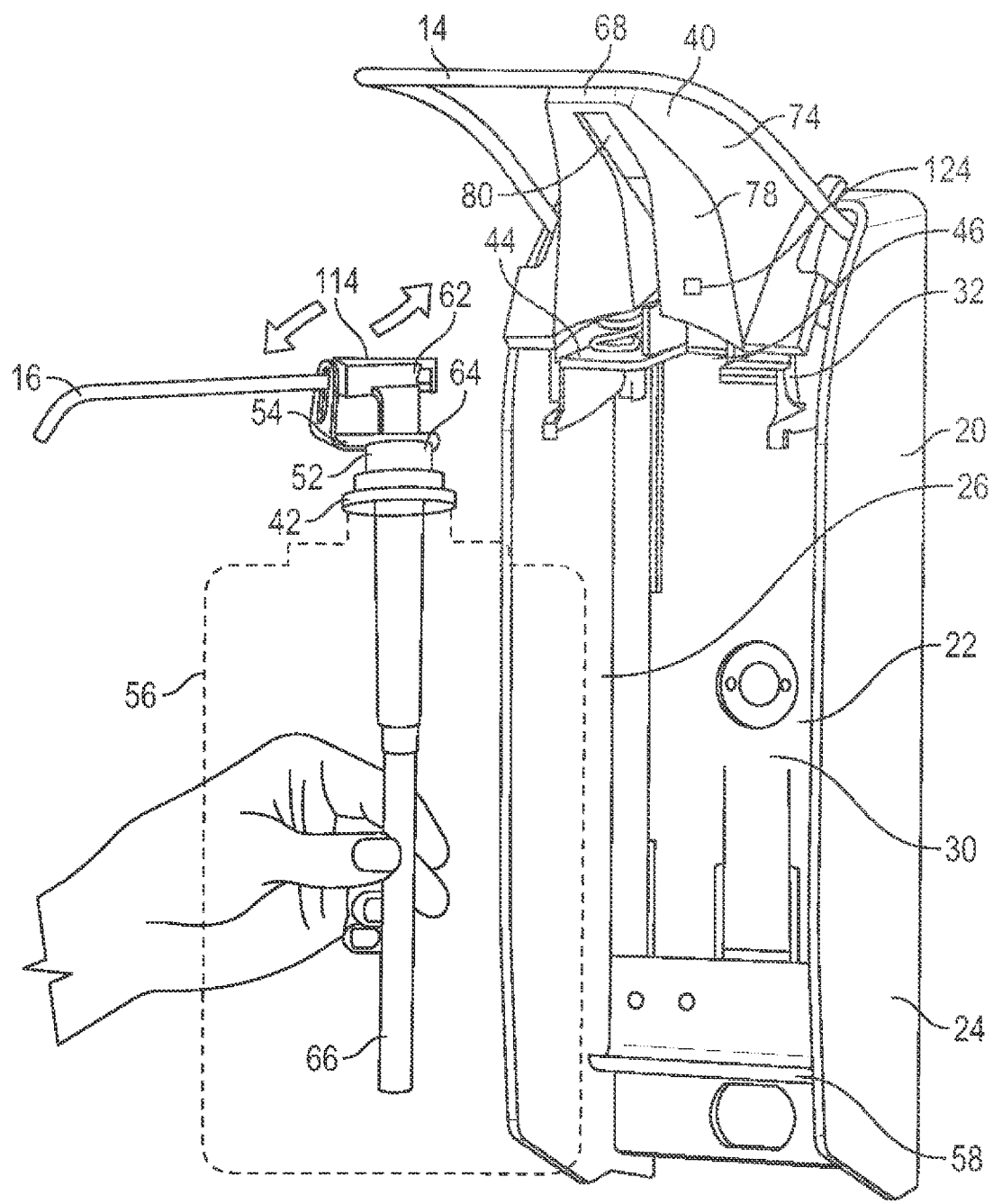
FIG. 2 is a perspective view of the fluid dispenser of FIG. 1, with a nozzle shield in a raised, open position, and a bottle removed and a pump mechanism being manually held by a user ready for insertion or removal.
Figure 3:
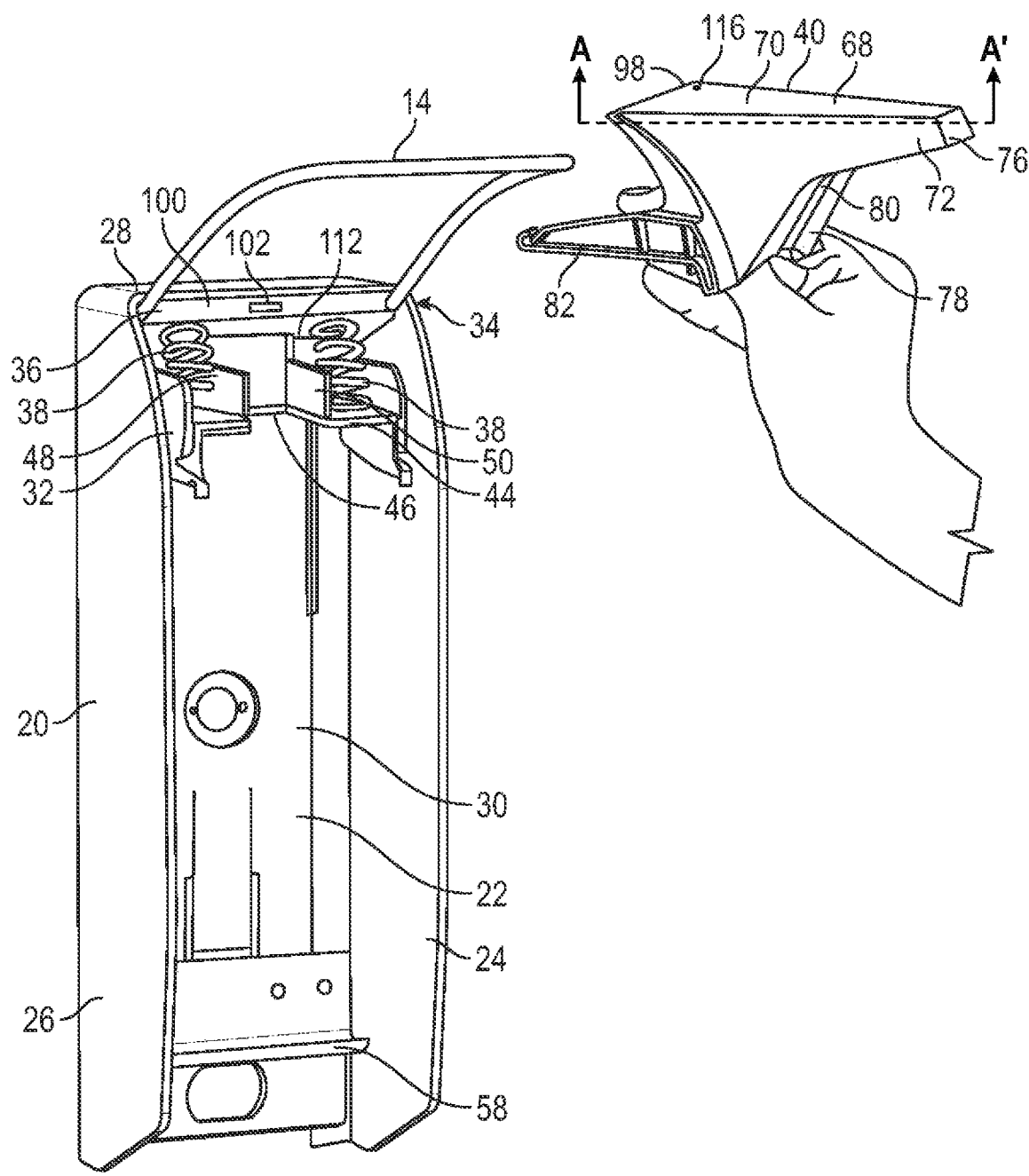
FIG. 3 is a perspective view of the fluid dispenser of FIG. 2 with the nozzle shield removed.

FIGS. 1 to 3 show a fluid dispenser 10 in accordance with a first embodiment of the present invention. The fluid dispenser 10 has a construction generally similar to that shown and described in U.S. Pat. No. 7,748,573 to Anhuf et al., issued Jul. 6, 2010, which is incorporated herein by reference.

The fluid dispenser 10 is adapted to be secured to a wall, not shown, and is adapted for manual activation as shown in FIG. 1 as by a user using one arm 12 to urge a lever 14 downwardly so as to dispense fluid 60 from a nozzle 16 onto the hand 18 of the user's other arm.

Referring to FIG. 3, the dispenser 10 includes a housing 20 having a back plate 22, spaced side walls 24 and 26, and a top wall 28 defining an interior 30 therebetween. A housing chassis/support member 32 is fixedly secured in the interior 30 of the housing 20 between the side walls 24 and 26 proximate the top wall 28. A lever mechanism 34 is pivotally mounted to the support member 32. The lever mechanism 34 includes the lever 14 and a lever bridge plate 36 fixedly secured to the lever 14. Lever springs 38 are disposed between the lever bridge plate 36 and the support member 32 so as to bias the lever 14 to an upper raised position. A front face 100 of the lever bridge plate 36 carries a removable magnet 102.

FIG. 3 shows a nozzle shield 40 separate from the housing 20 and ready for manual coupling to the support member 32. FIG. 2 illustrates the dispenser 10 with the nozzle shield 40 coupled to the support member 32 and placed in a raised open position in which position the nozzle shield 40 permits a pump mechanism 42 to be coupled or uncoupled to the support member 32 by sliding forwardly or rearwardly. In this regard, the support member 32 carries a support plate 44 with a central slot 46 open at a forward end. As seen in FIG. 3, vertical side walls 48 and 50 extend upwardly from the support plate 44 on each side thereof. The pump mechanism 42 is adapted to slide rearwardly into the central slot 46 with the slot 46 disposed about a cylindrical portion 52 of the pump mechanism 42 with an enlarged radius rectangular plate 54 above the cylindrical portion 52 to be received above the support plate 44 and located against rotation between vertical side walls 48 and 50.

As shown in FIG. 2 in dashed lines, a bottle 56 containing a supply of the fluid 60 to be dispensed may be secured to the pump mechanism 42 such that a unit, preferably disposable, comprising the pump mechanism 42 and the bottle 56 may be coupled and removed for replacement by the forward access to the interior 30 of the housing 20 with the nozzle shield 40 in the raised open position. The bottom of the bottle 56 may be supported by a support ledge 58 secured across the back plate 22 of the housing 20. With the bottle 56 and the pump mechanism 42 inserted and the nozzle shield 40 in a closed lowered position as shown in FIG. 1, pressing downwardly on the lever 14 will dispense fluid 60 out of the nozzle 16 of the pump mechanism 42. The pump mechanism 42 preferably comprises a piston pump assembly with the nozzle 16 comprising a forward hollow tubular extension from a piston 62 which is slidable within a piston chamber forming element 64 which has the fluid 60 fed to it from the bottle 56 via a dip tube 66. The piston 62 is reciprocally vertically displaced by the lever mechanism 34 to pump the fluid 60 from the bottle 56 out through the nozzle 16.

As shown in FIGS. 1 and 2, the nozzle shield 40 has a forwardly extending shroud portion 68 with a top wall 70, two side walls 72 and 74, a front wall 76, and a bottom wall 78. The bottom wall 78 has a vertical central channelway 80 therethrough to accommodate the nozzle 16. The channelway 80 permits, for example, in use the relative vertical movement of the nozzle 16 relative to the nozzle shield 40 and, as well, for the nozzle shield 40 to be moved relative to the nozzle 16 between the open position shown in FIG. 2 and the closed position shown in FIG. 1. As shown in FIG. 3, a hook arm 82 extends rearwardly from the rear of the left side wall 72 of the nozzle shield 40. A second hook arm, not shown, extends rearwardly from the rear of the right side wall 74 of the nozzle shield 40. The hook arms 82 permit the nozzle shield 40 to releasably couple to the support member 32 and, when coupled to the support member 32, to pivot between the raised open position of FIG. 2 and the lowered closed position of FIG. 1, as is more fully described in U.S. Pat. No. 7,748,573 to Anhuf et al., issued Jul. 6, 2010.

Figure 4:
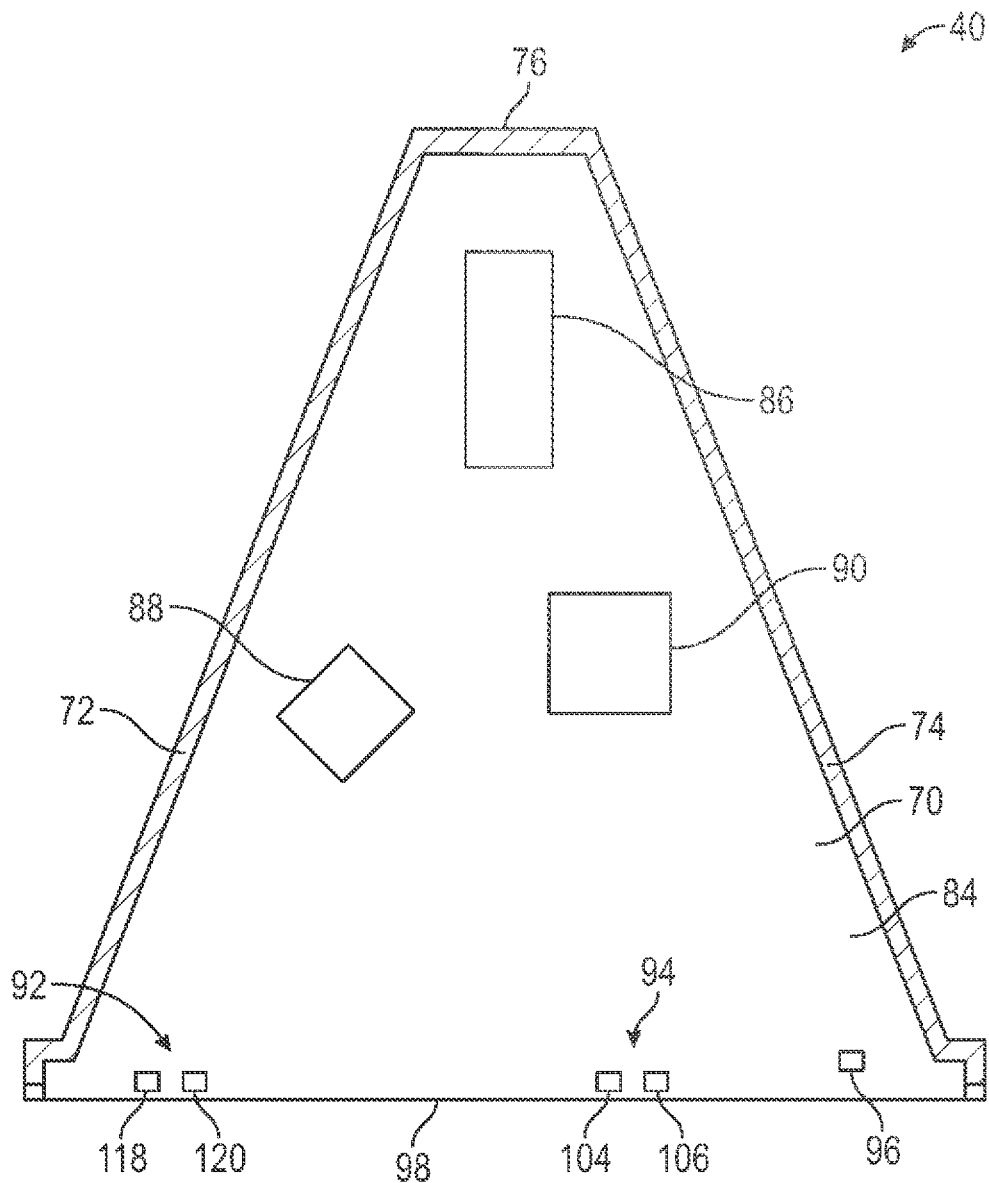
FIG. 4 is a cross-sectional view of the nozzle shield shown in FIG. 3, taken along line A-A' in FIG. 3.
Figure 5:
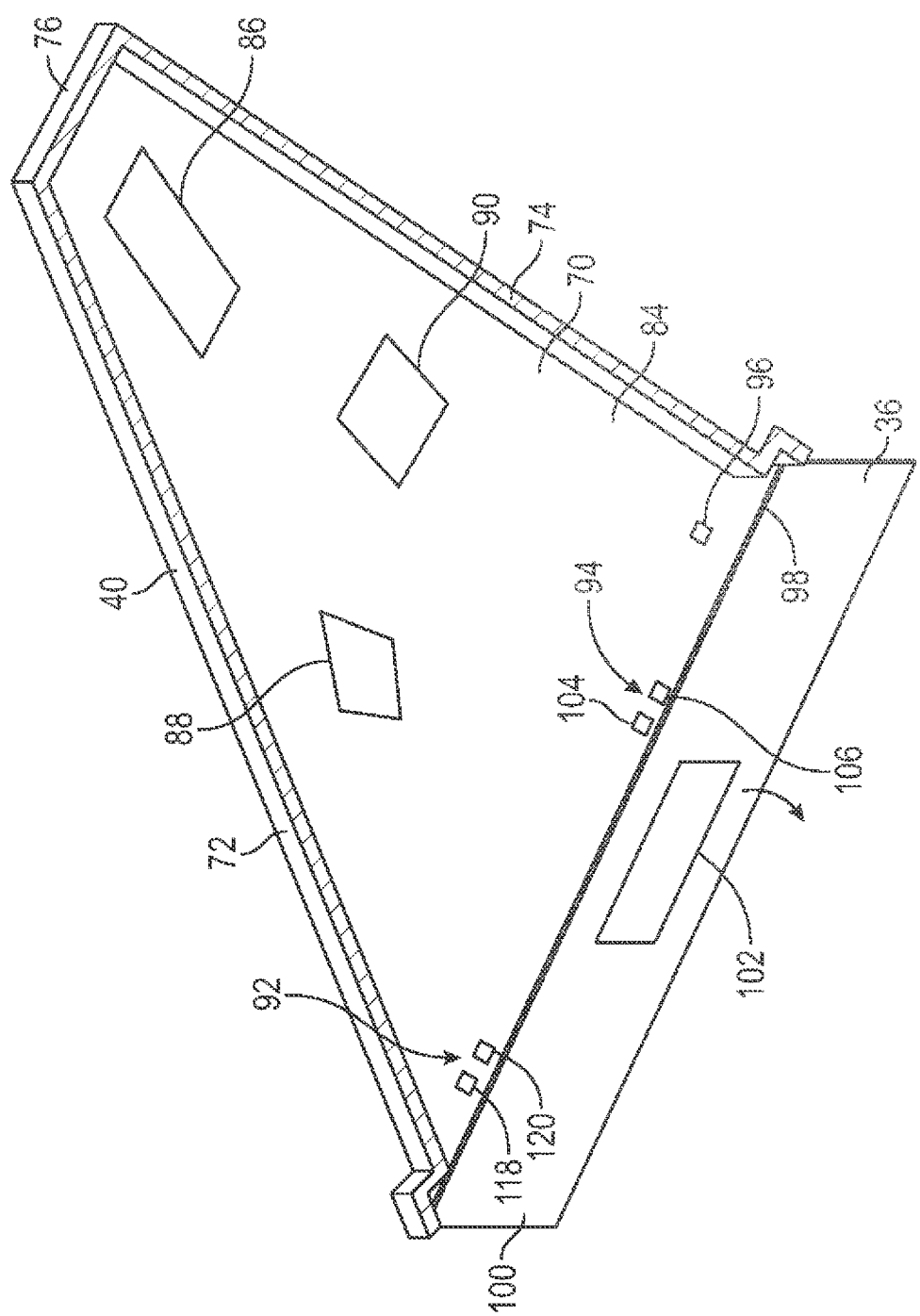
FIG. 5 is a bottom perspective view showing the cross-section of the nozzle shield shown in FIG. 4 adjacent to a front face of an actuator plate of the fluid dispenser shown in FIG. 1, showing the relative position of the nozzle shield and the actuator plate when the actuator plate is in an unbiased first position.

As shown in FIG. 4, the downwardly directed inside bottom surface of the top wall 70 of the nozzle shield 40 carries a printed circuit board 84 that carries a number of electronic components, including a battery 86, a microcontroller 88, a communication device 90, an activation sensor 92, a pump position sensor 94, and a bottle detector 96. The activation sensor 92, the pump position sensor 94, and the bottle detector 96 are positioned adjacent to a rear edge 98 of the top wall 70 of the nozzle shield 40. As shown in FIG. 5, the rear edge 98 of the top wall 70 of the nozzle shield 40 is positioned adjacent to the front face 100 of the lever bridge plate 36 when the nozzle shield 40 is coupled to the support member 32 in the lowered closed position shown in FIG. 1 and the lever bridge plate 36 is in the upper raised position of the lever mechanism 34 shown in FIG. 3. The upper raised position of the lever bridge plate 36 is also referred to herein as the unbiased first position.

Figure 9:
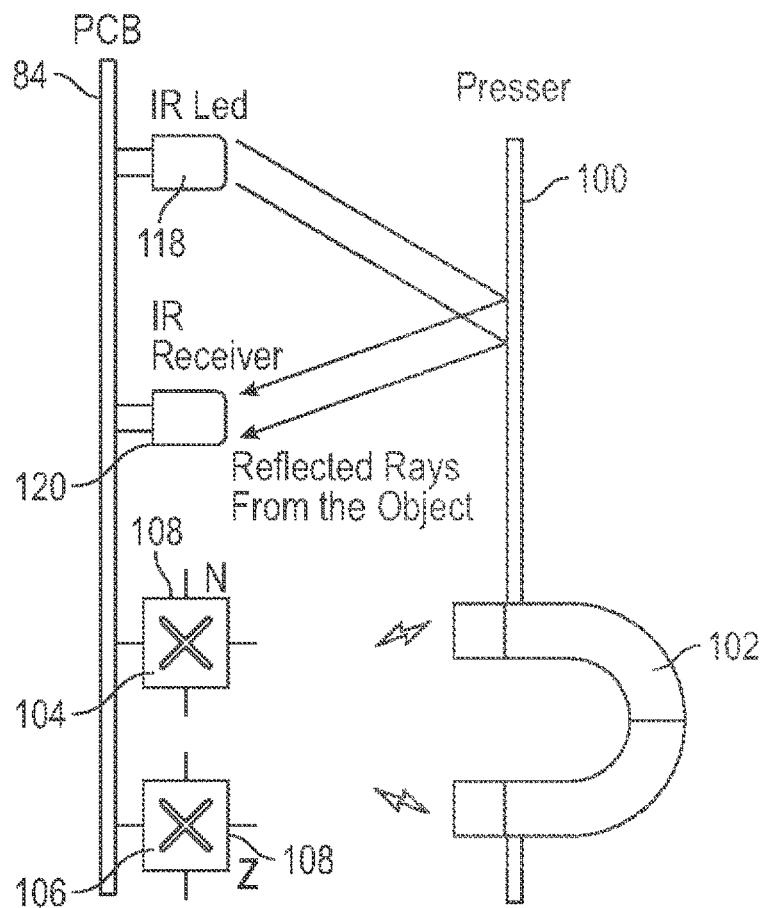
FIG. 9 is a simplified conceptual representation of the front face of the actuator plate and the circuit board of the nozzle shield, conceptually showing the magnet attached to the front face of the actuator plate and the first magnetic sensor, the second magnetic sensor, and a light sensor attached to the circuit board of the nozzle shield of the fluid dispenser of FIG. 1.
Figure 10:
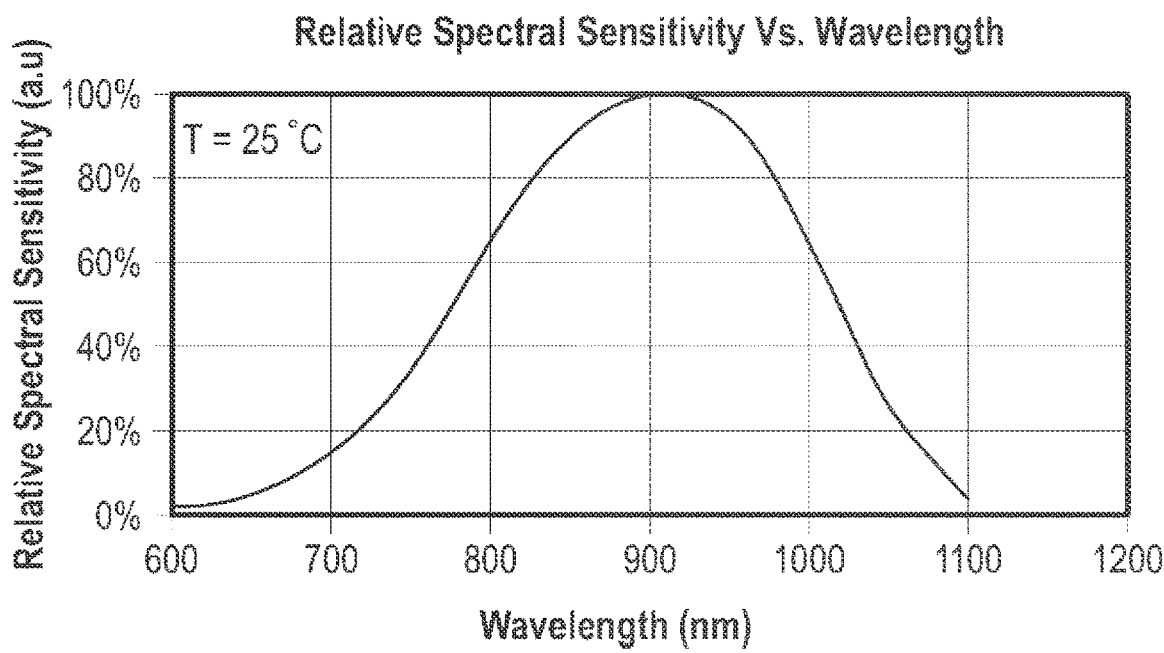
FIG. 10 is a graph showing the spectral sensitivity of the light sensor attached to the nozzle shield of the fluid dispenser of FIG. 1.
Figure 11:
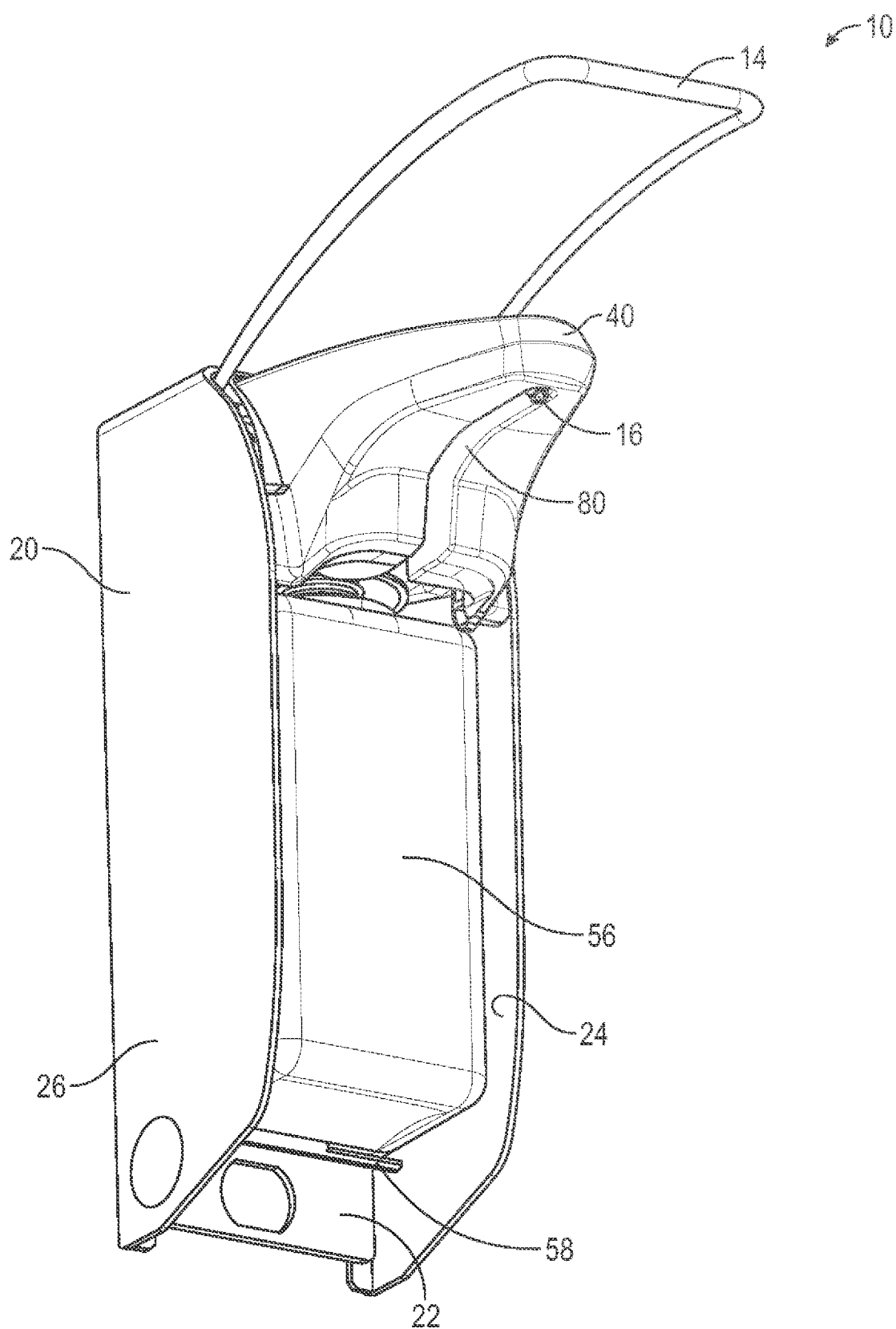
FIG. 11 is a bottom perspective view of a second embodiment of a dispenser generally the same as that in FIG. 1 but with a different nozzle shield.

The activation sensor 92 comprises a light emitter 118 and a light receiver or light sensor 120. The light emitter 118 is preferably a light emitting diode (LED), and is also referred to herein as the LED 118. The LED 118 is configured to, when activated, emit rays of electromagnetic radiation rearwardly so that, when the lever bridge plate 36 is positioned at the unbiased first position shown in FIG. 5, the rays are reflected from the front face 100 of the lever bridge plate 36 back towards the light receiver 120. A schematic illustration of the rays of electromagnetic radiation being emitted by the LED 118 and reflected back to the light receiver 120 is shown in FIG. 9. The light receiver 120 is configured to detect the rays of electromagnetic radiation emitted by the LED 118, and to send the resulting detection data to the microcontroller 88. Preferably, the LED 118 emits infrared light and the light receiver 120 is configured to detect the infrared light, although other forms of electromagnetic radiation such as visible light could also be used. Preferably, the light receiver 120 is also able to detect visible light, and may for example have the spectral sensitivity as shown in FIG. 10.

The pump position sensor 94 comprises a first magnetic sensor 104 and a second magnetic sensor 106. The first magnetic sensor 104 and the second magnetic sensor 106 are configured to detect the magnetic field of the magnet 102 attached to the front face 100 of the lever bridge plate 36. As shown schematically in FIG. 9, the first magnetic sensor 104 has a different orientation relative to the printed circuit board 84 than the second magnetic sensor 106. In particular, the north end 108 of the first magnetic sensor 104 faces in a direction that is parallel to the printed circuit board 84 and the north end 108 of the second magnetic sensor 106 faces in a direction that is perpendicular to the printed circuit board 84. The first magnetic sensor 104 is thus oriented 90 degrees relative to the second magnetic sensor 106.

The bottle detector 96 is configured to detect the presence of a bottle 56 in the interior 30 of the housing 20. The bottle detector 96 may, for example, be an infrared sensor that directs a focused beam of infrared light into the interior 30 of the housing 20, and if a bottle 56 is present, detects the infrared light that is reflected from the bottle 56 back to the detector 96.

The communication device 90 wirelessly sends and receives data between the fluid dispenser 10 and an external device such as, for example, the smart watch 110 shown in dotted lines on the user's wrist in FIG. 1. Any suitable type of communication device 90 could be used including, for example, devices that communicate via WiFi and/or NFC (Near Field Communication).

The battery 86 supplies electrical energy to each of the electronic components of the dispenser 10, including the microcontroller 88, the communication device 90, the activation sensor 92, the pump position sensor 94, and the bottle detector 96, and the microcontroller 88 controls the operation of each of the electronic components of the dispenser 10, including the communication device 90, the activation sensor 92, the pump position sensor 94, and the bottle detector 96. The microcontroller 88 is preferably configured to control the electronic components of the dispenser 10 so as to reduce the amount of electrical energy that is used, and thereby extend the lifespan of the battery 86, as is described in more detail below. The microcontroller 88 is also referred to herein as the controller 88.

A preferred mode of operating of the fluid dispenser 10 will now be described with reference to FIGS. 1 to 10. To assemble the fluid dispenser 10 for use, the pump mechanism 42 and the bottle 56 are placed in the interior 30 of the housing 20, with the rectangular plate 54 of the pump mechanism 42 carried by the support plate 44 of the housing 20, and the nozzle shield 40 coupled to the support member 32 and pivoted to the lower closed position shown in FIG. 1.

When the fluid dispenser 10 is assembled and ready for use, a top surface 114 of the piston 62 of the pump mechanism 42 is positioned below the lever bridge plate 36. Before the dispenser 10 is activated, the lever bridge plate 36 is positioned at the upper raised position shown in FIG. 3 under the bias of the lever springs 38. To activate the dispenser 10, the user manually depresses the lever 14 as shown in FIG. 1. This causes the lever bridge plate 36 to pivot downwardly relative to the top wall 70 of the housing 20. As the lever bridge plate 36 pivots downwardly from the raised position of FIG. 3, a lower engagement surface 112 of the lever bridge plate 36 engages with the top surface 114 of the piston 62, forcing the piston 62 vertically downwards relative to the piston chamber forming element 64. This causes the pump mechanism 42 to dispense an allotment of fluid 60 from the bottle 56 in a manner as is known in the art.

The volume of the allotment of fluid 60 that is dispensed from the bottle 56 when the dispenser 10 is activated is dependent on the vertical distance that the piston 62 travels relative to the piston chamber forming element 64, and this is in turn dependent on the extent to which the user depresses the lever 14 and pivots the lever bridge plate 36 downwardly from the upper raised position of FIG. 3. For example, if the user depresses the lever 14 to its maximum extent, the piston 62 will travel a maximum stroke distance relative to the piston chamber forming element 64, causing the pump mechanism 42 to dispense a maximum allotment of the fluid 60. If the user instead only partially depresses the lever 14, the piston 62 will travel less than the maximum stroke distance relative to the piston chamber forming element 64, causing the pump mechanism 42 to dispense an allotment of the fluid 60 that is less than the maximum dose.

Preferably, the fluid dispenser 10 is capable of calculating or estimating the volume of fluid 60 that is dispensed with each activation of the dispenser 10. For example, in the embodiment shown in FIGS. 1 to 10, the volume of fluid 60 dispensed is calculated based on the movement of the lever bridge plate 36 as detected by the magnetic sensors 104 and 106.

Before the dispenser 10 is activated, the lever bridge plate 36 is in the unbiased first position shown in FIG. 3 and the nozzle shield 40 is in the lower closed position shown in FIG. 1, which places the front face 100 of the lever bridge plate 36 immediately adjacent to the rear edge 98 of the top wall 70 of the nozzle shield 40, as shown in FIG. 5. When the dispenser 10 is activated by the user depressing the lever 14, the front face 100 of the lever bridge plate 36 begins to pivot downwardly away from the rear edge 98 of the top wall 70 to the intermediate second position shown in FIG. 6. As the lever 14 is depressed further downwardly, the front face 100 of the lever bridge plate 36 continues to pivot downwardly until, if the lever 14 is depressed to its maximum extent, it reaches the fully depressed third position shown in FIG. 7.

As the front face 100 pivots between the unbiased first position, the intermediate second position, the fully depressed third position, and all of the positions in between, the location and orientation of the magnet 102 relative to the magnetic sensors 104 and 106 changes. As a result, the strength of the magnetic field that is detected by the magnetic sensors 104 and 106 changes depending on the position of the lever bridge plate 36.

Figure 8:
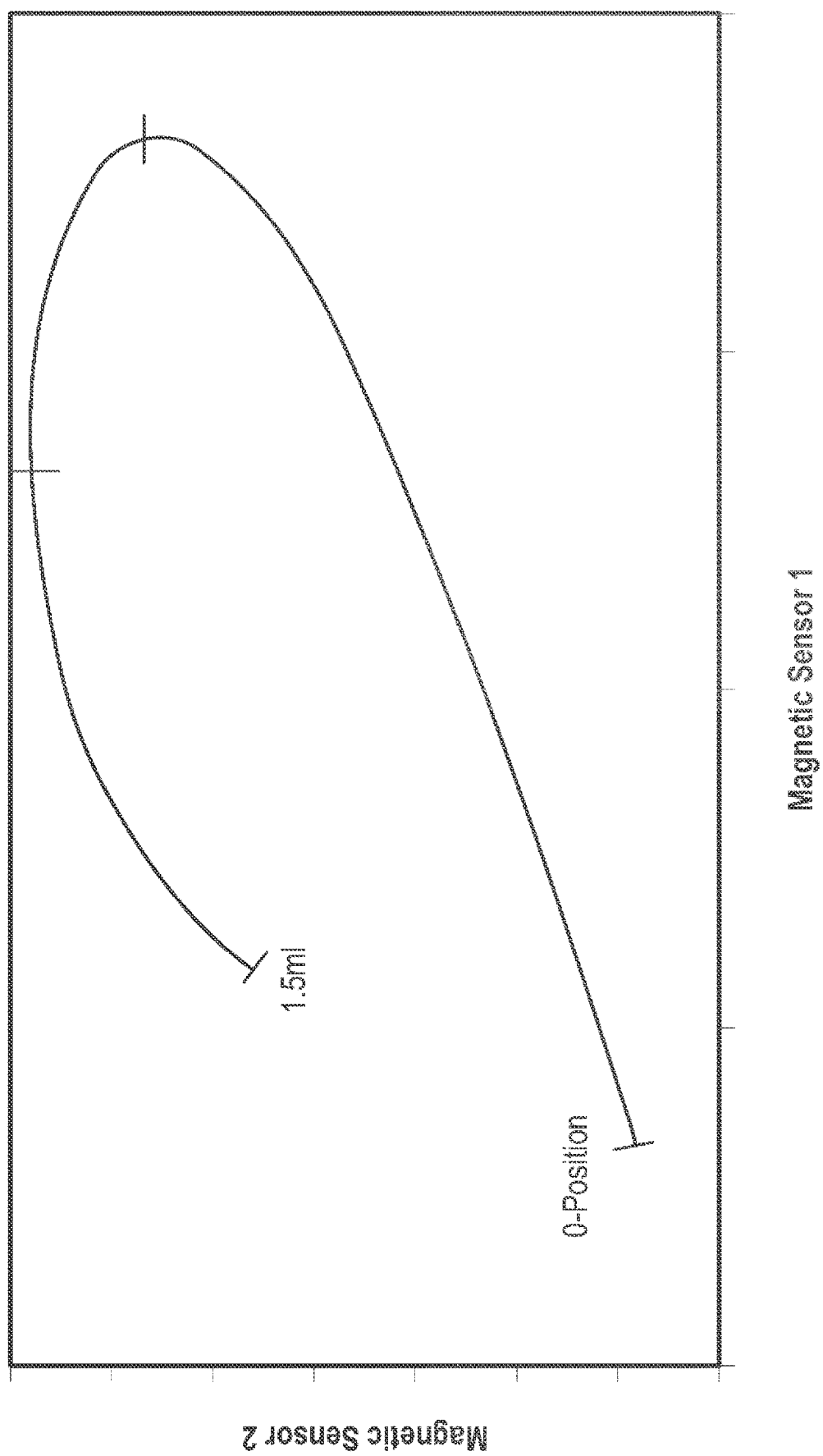
FIG. 8 is a graph showing the relative strength of the magnetic field of a magnet attached to the front face of the actuator plate as measured by a first magnetic sensor and a second magnetic sensor on a circuit board of the nozzle shield as the actuator plate moves from the first position shown in FIG. 5 to the third position shown in FIG. 7.

Furthermore, as the two magnetic sensors 104 and 106 are oriented at 90 degrees relative to one another, each of the magnetic sensors 104 and 106 detects the magnetic field from a different perspective. This is illustrated in FIG. 8, which schematically shows the strength of the magnetic field as detected by each of the two magnetic sensors 104 and 106 as the front face 100 pivots between the unbiased first position, which is labelled in FIG. 8 as "0-position", and the fully depressed third position, which is labelled in FIG. 8 as "1.5 ml", 1.5 ml being the volume of fluid 60 that is dispensed when the lever 14 is depressed to the maximum extent in one embodiment of the invention. As can be seen in FIG. 8, for each position of the front face 100 as it pivots between the unbiased first position and the fully depressed third position there is a corresponding unique set of magnetic field strength detection values as detected by the first magnetic sensor 104 and the second magnetic sensor 106. As such, by combining the detection data from the first magnetic sensor 104 and the second magnetic sensor 106, it is possible to accurately determine the position of the front face 100 relative to the magnetic sensors 104 and 106, as well as the change in position of the front face 100 relative to the magnetic sensors 104 and 106 over time.

Furthermore, as the change in position of the front face 100 relative to the magnetic sensors 104 and 106 is correlated to the change in position of the lever 14, the change in position of the lever bridge plate 36, the change in position of the piston 62, and the volume of fluid 60 that is dispensed, each of these values can also be determined based on the detection data from the magnetic sensors 104 and 106. The calculation of one or more of these values can be done by the microcontroller 88 or by a separate processor, not shown.

The calculated volume of fluid 60 that is dispensed when the dispenser 10 is activated can be used for a variety of different purposes. For example, in one preferred implementation of the invention, the nozzle shield 40 is provided with an indicator light 116 that lights up based on the volume of fluid 60 that has been dispensed. The indicator light 116 may, for example, be located on the top wall 70 of the nozzle shield 40, as shown in FIG. 1.

The microcontroller 88 is preferably configured to compare the volume of fluid 60 that is dispensed when the dispenser 10 is activated to a threshold volume. The threshold volume may, for example, be a volume of fluid 60 that is required to be dispensed onto a user's hand 18 for compliance with a hand hygiene protocol in effect in the location where the dispenser 10 is located. If the volume of fluid 60 dispensed is equal to or above the threshold volume, the microcontroller 88 preferably illuminates the indicator light 116 in the color green, thereby providing an indication to the user that they have dispensed enough fluid 60 to comply with the hand hygiene protocol. If the volume of fluid 60 dispensed is less than the threshold volume, as might occur for example if the lever 14 is not fully depressed, the microcontroller 88 preferably illuminates the indicator light 116 in the color red, thereby providing an indication to the user that not enough fluid 60 has been dispensed. To comply with the hand hygiene protocol, the user then preferably activates the dispenser 10 again to dispense a further allotment of fluid 60.

Preferably, the microcontroller 88 is configured to calculate the total volume of fluid 60 that is dispensed over a given time period. For example, the microcontroller 88 may be configured to calculate the total volume of fluid 60 that is dispensed over multiple activations of the dispenser 10 that occur within a short time period, such as 5 or 10 seconds. The time period is preferably selected to approximate the length of time that a single user would normally interact with the dispenser 10, so that the total volume of fluid 60 dispensed over the time period will correspond to the total volume of fluid 60 dispensed onto a single user's hand 18. Preferably, the microcontroller 88 is configured to compare the total volume of fluid 60 that is dispensed over the selected time period to the threshold volume, and to adjust the illumination of the indicator light 116 accordingly. For example, the microcontroller 88 may be configured to illuminate the indicator light 116 the color red after a user initially activates the dispenser 10, if the volume of fluid 60 dispensed is less than the threshold volume. If the user then activates the dispenser 10 again to dispense a further allotment of fluid 60, the microcontroller 88 preferably calculates the total volume of fluid 60 dispensed by both activations and compares this total volume to the threshold volume. If the total volume of fluid 60 dispensed in both activations is equal to or exceeds the threshold volume, the microcontroller 88 preferably switches the indicator light 116 from red to green, thereby providing the user with an indication that they have now dispensed enough fluid 60 to comply with the hand hygiene protocol.

The calculated volume of fluid 60 that has been dispensed may also be used, for example, to keep track of the volume of fluid 60 remaining in the bottle 56 over time. For example, the microcontroller 88 may be configured to recognize when a new bottle 56 has been installed in the dispenser 10 based on detection data received from the bottle detector 96, and to determine the volume of fluid 60 in the bottle 56 based on the known volume of fluid 60 contained in a full bottle 56. With each activation of the dispenser 10, the microcontroller 88 preferably subtracts the volume of fluid 60 dispensed from the total volume of fluid 60 remaining in the bottle 56. This allows the microcontroller 88 to recognize when the bottle 56 is nearly empty and requiring replacement. Preferably, the microcontroller 88 is configured to provide an indication to maintenance staff when the bottle 56 requires replacement. For example, the microcontroller 88 could be configured to illuminate the indicator light 116 in a flashing color to notify maintenance staff that the bottle 56 needs to be replaced. Alternatively, the microcontroller 88 could control the communication device 90 to transmit an electronic signal to the maintenance staff that the bottle 56 needs to be replaced. The electronic signal could, for example, be in the form of an e-mail or text message sent to a mobile device such as a smart phone.

Data about the volume of fluid 60 dispensed and the volume of fluid 60 remaining in the bottle 56 could also, for example, be sent by the communication device 90 to an external hand hygiene compliance tracking system.

Depending on where the fluid dispenser 10 is located, there may be periods of minutes, hours, or days in which the dispenser 10 is not activated. For example, a hand cleaning fluid dispenser 10 located in an office building may dispense little or no fluid 60 over a typical weekend.

During periods of time in which the dispenser 10 is not in use, there is generally little or no benefit to having the magnetic sensors 104 and 106 monitoring the location of the lever bridge plate 36, as the lever bridge plate 36 remains stationary at the upper raised position shown in FIG. 3 and no fluid 60 is being dispensed. To save energy, the microcontroller 88 is therefore preferably configured to activate the magnetic sensors 104 and 106 only when the dispenser 10 is in use, and to deactivate the magnetic sensors 104 and 106 during periods of inactivity.

Preferably, the microcontroller 88 relies on detection data from the activation sensor 92 to determine whether the fluid dispenser 10 is in use. The activation sensor 92 is preferably configured to periodically emit rays of electromagnetic radiation from the LED 118 and detect whether the rays are reflected back onto the light receiver 120. The LED 118 may, for example, be configured emit rays of electromagnetic radiation about 50 times per second.

When the dispenser 10 is not in use and the lever bridge plate 36 is in the unbiased first position shown in FIG. 3, the front face 100 of the lever bridge plate 36 is positioned immediately adjacent to the activation sensor 92, as shown in FIG. 5. With the front face 100 immediately adjacent to the activation sensor 92 in the unbiased first position, the rays of electromagnetic radiation emitted by the LED 118 are reflected from the front face 100 back onto the light receiver 120.

When the dispenser 10 is inactive, the position of the front face 100 of the lever bridge plate 36 does not change, and so the amount of light reflected onto the light receiver 120 remains more or less the same.

When the dispenser 10 is activated, the front face 100 pivots downwardly away from the rear edge 98 of the nozzle shield 40. As soon as the front face 100 begins pivoting downwardly, the angle of the front face 100 relative to the activation sensor 92 changes, as does the portion of the front face 100 receiving the light emitted from the LED 118. As a result, the amount of light that is reflected from the front face 100 onto the light receiver 120 changes as soon as the lever bridge plate 36 starts moving, and this change in light is preferably detected by the light receiver 120.

Figure 6:
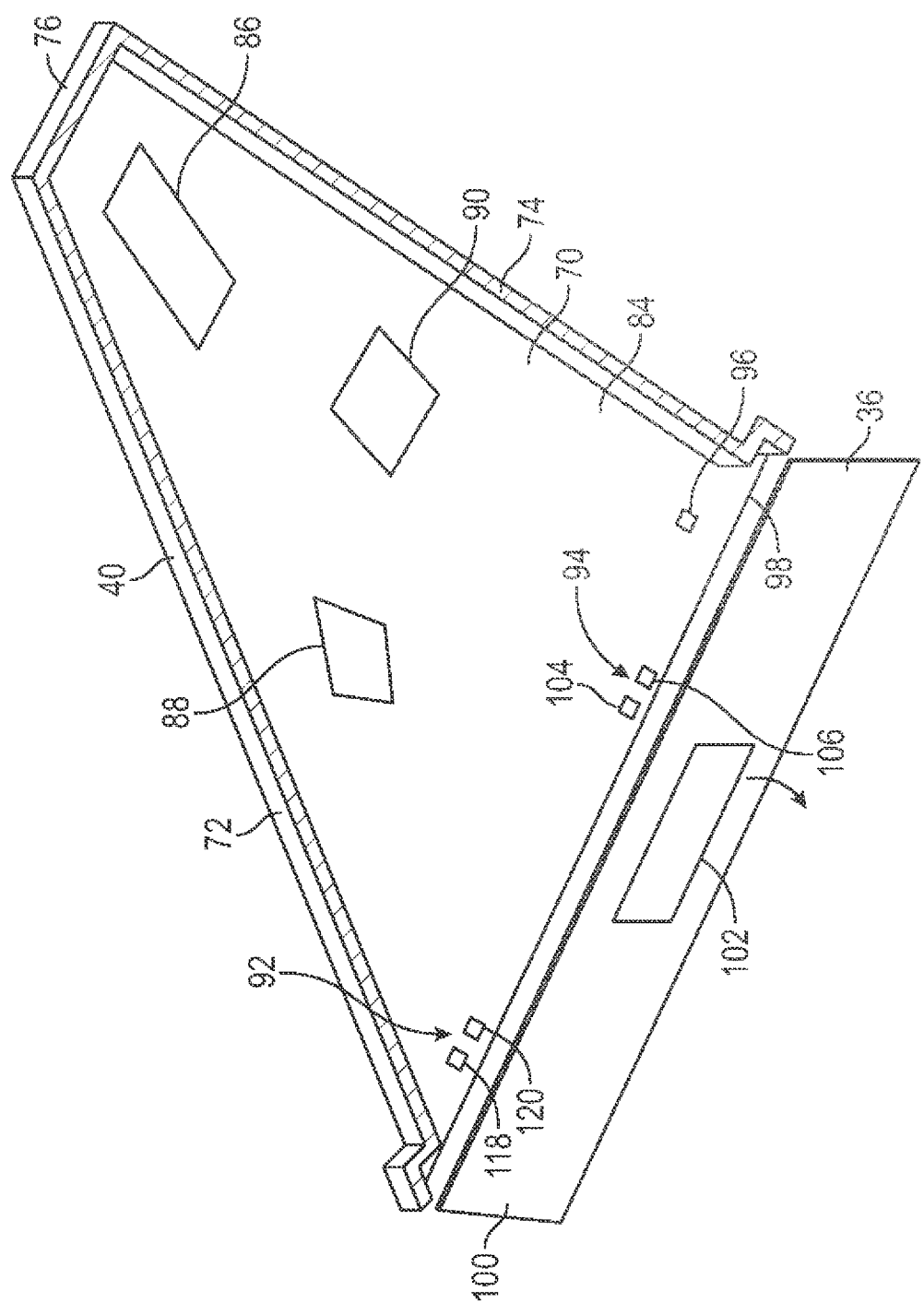
FIG. 6 is a bottom perspective view of the cross-section of the nozzle shield and the front face of the actuator plate of FIG. 5, showing the relative position of the nozzle shield and the front face of the actuator plate when the actuator plate is in an intermediate second position.
Figure 7:
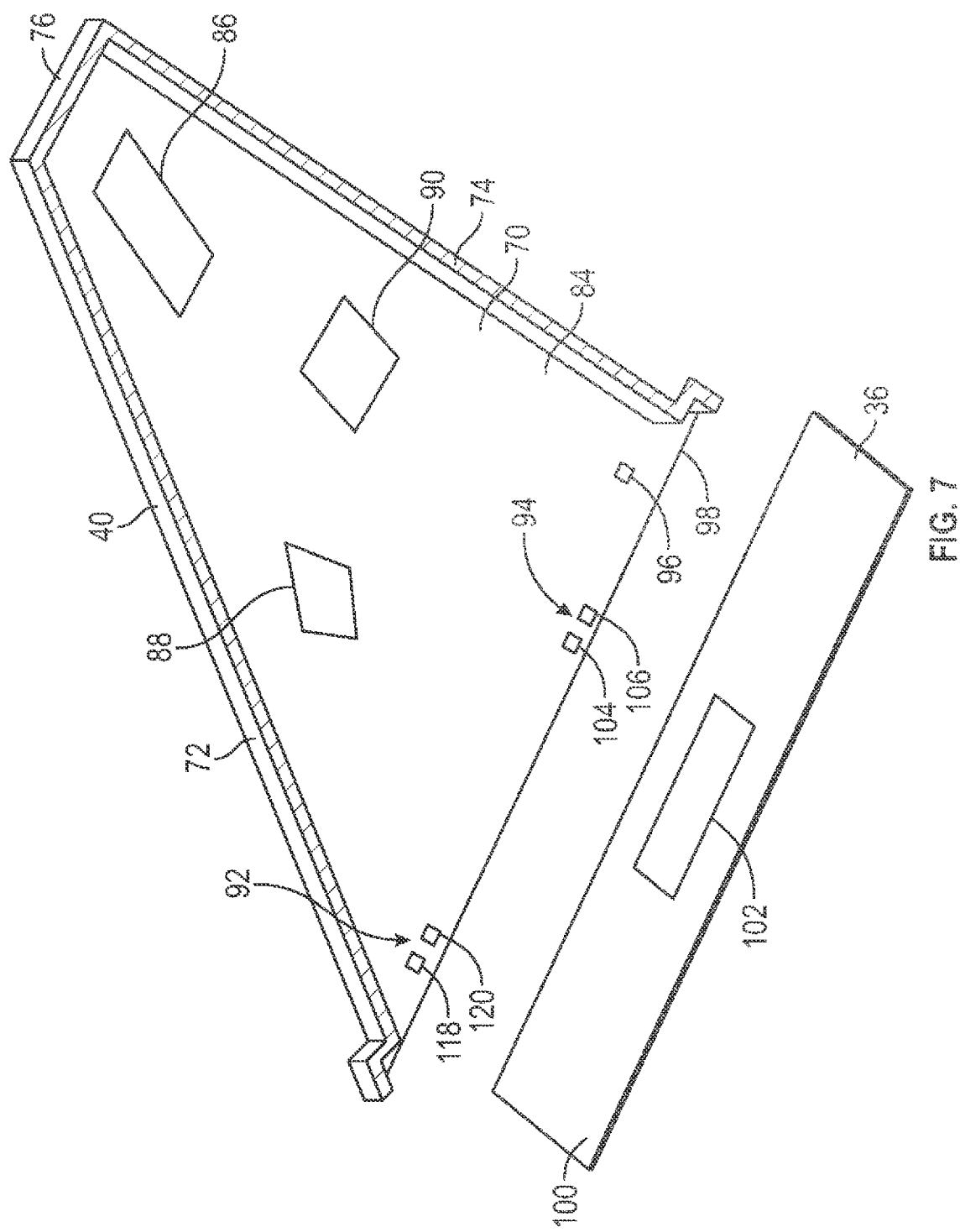
FIG. 7 is a bottom perspective view of the cross-section of the nozzle shield and the front face of the actuator plate of FIG. 5, showing the relative position of the nozzle shield and the front face of the actuator plate when the actuator plate is in a fully depressed third position.

When the front face 100 reaches the intermediate second position shown in FIG. 6, the front face 100 is positioned far enough below the LED 118 that the light emitted from the LED 118 passes above the front face 100 and therefore is not reflected back from the front face 100 onto the light receiver 120. As a result, there is a large decrease in the amount of light detected by the light receiver 120.

Detection data indicative of the amount of light detected by the light receiver 120 is sent from the activation sensor 92 to the microcontroller 88, and the microcontroller 88 is preferably configured to determine whether the dispenser 10 has been activated based on the detection data. Preferably, the microcontroller 88 is able to immediately determine when the dispenser 10 has been activated based on the changes in the amount of light that is reflected from the front face 100 onto the light receiver 120 as soon as the lever bridge plate 36 starts moving. Alternatively, the microcontroller 88 may be configured to determine that the dispenser 10 has been activated when the front face 100 reaches the intermediate second position shown in FIG. 6, based on the large decrease in the amount of light detected by the light receiver 120.

Upon determining that the dispenser 10 has been activated, the microcontroller 88 preferably immediately activates the magnetic sensors 104 and 106, so that the volume of fluid 60 that is dispensed can be calculated as described above.

After the dispenser 10 is activated and the lever 14 is released, the front face 100 of the lever bridge plate 36 returns to the unbiased first position shown in FIG. 5 under the bias of the lever springs 38. With the front face 100 once again immediately adjacent to the activation sensor 92 in the unbiased first position, the rays of electromagnetic radiation emitted by the LED 118 are reflected from the front face 100 and detected by the light receiver 120. Based on the detection data, the microcontroller 88 is preferably configured to determine that the lever bridge plate 36 is back in the unbiased first position. Optionally, the microcontroller 88 is configured to immediately deactivate the magnetic sensors 104 and 106 once it is determined that the lever bridge plate 36 is back in the unbiased first position. Alternatively, the microcontroller 88 could be configured to wait for a preselected length of time, such as 5 or 10 seconds, before deactivating the magnetic sensors 104 and 106.

The microcontroller 88 could also be configured to control the functions of any of the other electronic components of the dispenser 10 based on the detection data received from the activation sensor 92. For example, the microcontroller 88 could be configured to activate the communication device 90 to send hand hygiene compliance data to an external tracking system each time the dispenser 10 is activated, relying on the detection data from the activation sensor 92 to determine when the dispenser 10 has been activated. To save energy, the microcontroller 88 could also be configured to deactivate the communication device 90 whenever the fluid dispenser 10 is not in use.

The light sensor 120 could also be used for other purposes besides determining when the dispenser 10 has been activated. For example, the light sensor 120 is preferably configured to detect the level of ambient light in or around the fluid dispenser 10. The level of ambient light can be used, for example, as an indication of whether the fluid dispenser 10 is in storage, and this information can be used by the microcontroller 88 to control the functions of the electronic components of the dispenser 10.

Often, when fluid dispensers 10 are manufactured for sale, they are assembled with a built-in battery 86 that will provide electrical energy to the electronic components of the dispenser 10 when the dispenser 10 is later used by a customer. The fluid dispenser 10 is then placed in a package for delivery to the customer. In some circumstances, the fluid dispenser 10 may remain in storage in the package for an extended period of time. The package may, for example, be an enclosure such as a cardboard box that substantially prevents light from reaching the dispenser 10 from outside the enclosure, or which substantially decreases the amount of light that reaches the dispenser 10 from outside the enclosure.

While in storage, many of the functions provided by the electronic components of the dispenser 10 are not needed. To save energy, the microcontroller 88 is therefore preferably configured to determine whether the fluid dispenser 10 is in storage based on the level of ambient light that is detected by the light sensor 120 over time. If the microcontroller 88 determines that the fluid dispenser 10 is in storage, the microcontroller 88 preferably deactivates any of the electronic components whose functions are not required while in storage, or sets them to a storage or energy-saving mode in which they use little or no electrical energy. When the fluid dispenser 10 is later removed from the package by the customer, and the level of ambient light detected by the light sensor 120 increases, the microcontroller 88 preferably activates any of the electronic components that are now required, or sets them to an active or unpackaged mode.

Having the microcontroller 88 automatically wake up the electronic components of the dispenser 10 when the dispenser 10 is removed from its packaging provides the advantage that the customer does not need to locate and activate a manual ON switch to turn on the electronic components. This preferably improves the customer experience, and avoids the problem of the customer failing to turn on the electronic components.

The microcontroller 88 can be configured to control the function of any of the electronic components of the dispenser 10 based on the ambient light level as detected by the light sensor 120, including for example the communication device 90, the pump position sensor 94, or the bottle detector 96. The microcontroller 88 can also control the function of the activation sensor 92, including the light emitter 118 and the light sensor 120, based on the level of ambient light detected by the light sensor 120.

For example, the activation sensor 92 optionally has an active mode of operation and a storage mode of operation. When in the active mode of operation, the LED 118 emits rays of light about 50 times per second, and the light receiver 120 detects the amount of light reflected back from the front face 100 of the lever bridge plate 36 for the purpose of determining whether the dispenser 10 has been activated, as described above.

When the dispenser 10 is in storage, the dispenser 10 generally cannot be activated, and so it is not necessary for the activation sensor 92 to detect movements of the lever bridge plate 36. To save energy, the microcontroller 88 therefore preferably sets the activation sensor 92 to operate in the storage mode when the microcontroller 88 determines that the dispenser 10 is in storage based on the level of ambient light detected by the light sensor 120. When in the storage mode, the LED 118 does not emit rays of light. Instead, the light receiver 120 periodically samples the level of ambient light in or around the dispenser 10. The sample rate when in the storage mode may, for example, be about one detection of the ambient light level every 10 seconds or so.

When the dispenser 10 is removed from its package, the ambient light level increases, and this is detected by the light sensor 120. The microcontroller 88 preferably then switches the activation sensor 92 to the active mode of operation, so that the activation sensor 92 is able to detect when the fluid dispenser 10 is activated as described above.

The light sensor 120 could also be used to detect whether it is daytime or nighttime, or whether the fluid dispenser 10 is in an illuminated environment or a darkened environment, based on the ambient light level in or around the dispenser 10. When the dispenser 10 is in a darkened environment, this generally means that the lights are off in the room where the dispenser 10 is located. In many circumstances, if the lights are off in the room where the dispenser 10 is located, it is unlikely that the dispenser 10 will be activated. As such, the microcontroller 88 may optionally be configured to control one or more of the electronic components of the dispenser 10 to operate in an energy-saving mode when the microcontroller 88 determines that the dispenser 10 is in a darkened environment based on the ambient light level detected by the light sensor 120.

In some circumstances, the microcontroller 88 could similarly be configured to control one or more of the electronic components of the dispenser 10 to operate in an energy-saving mode when the microcontroller 88 determines that it is nighttime based on the ambient light level detected by the light sensor 120, if for example the dispenser 10 is located in an environment where it is unlikely to be activated during the night. The microcontroller 88 preferably returns the electronic components to an active mode of operation when the light sensor 120 detects an increase in the ambient light level indicative that it is daytime or that the lights have been turned on in the room where the dispenser 10 is located.

Reference is now made to FIGS. 11 to 16, which depict a fluid dispenser 10 in accordance with a second embodiment of the invention. The fluid dispenser 10 shown in FIGS. 11 to 16 is generally the same as shown in FIGS. 1 to 10, but with a different nozzle shield 40. Like numerals are used to denote like components.

Figure 14:
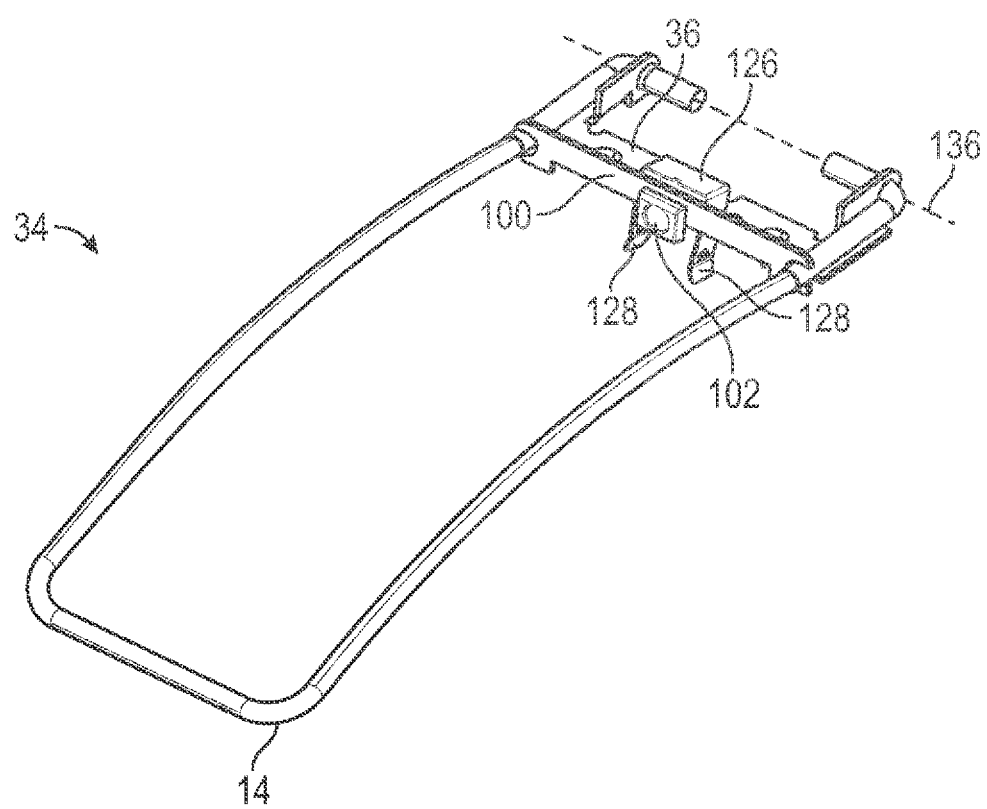
FIG. 14 is a pictorial view of a lever assembly of the dispenser of FIG. 11.

As best shown in FIG. 14, the lever assembly or lever mechanism 34 of the second embodiment of the invention comprises a lever 14 and a lever bridge plate 36, similarly to the first embodiment of the invention shown in FIGS. 1 to 10. In FIG. 14, the lever bridge plate 36 is shown as carrying a piston engagement member 126 having two downwardly projecting arms 128 that are configured to engage with the piston 62 in a snap fit. Although not shown in the drawings, the lever bridge plate 36 of the first embodiment of the invention could likewise carry a piston engagement member 126 for engaging with the piston 62. As in the first embodiment of the invention, the lever bridge plate 36 shown in FIG. 14 carries a magnet 102.

Figure 16:
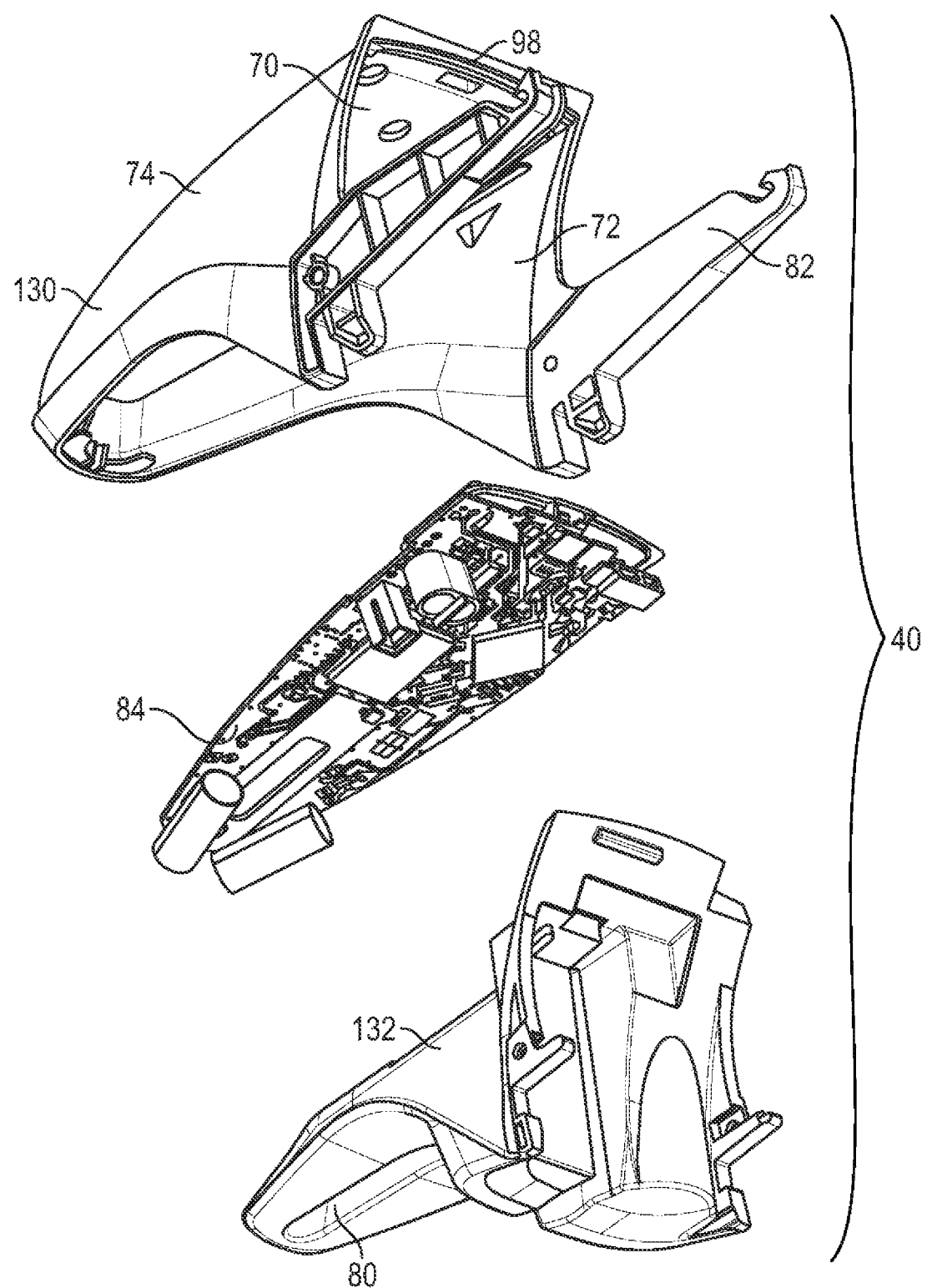
FIG. 16 is a partial exploded bottom pictorial view of the nozzle shield shown in FIG. 15.

As best shown in FIG. 16, the nozzle shield 40 has an upper cover portion 130, a lower cover portion 132, and a circuit board 84 that is sandwiched between the upper cover portion 130 and the lower cover portion 132. The upper cover portion 130 and the lower cover portion 132 fit together in a snap fit, with the circuit board 84 attached to the downwardly facing inner bottom surface of the top wall 70 of the upper cover portion 130. The lower cover portion 132 protects the circuit board 84 from coming into contact with the nozzle 16 or with the fluid 60 dispensed from the nozzle 16. Although not shown in the drawings, the nozzle shield 40 of the first embodiment of the invention could likewise include a lower cover portion 132 for protecting the circuit board 84.

Although not labelled on FIG. 16, the circuit board 84 of the second embodiment of the invention carries a battery 86, a microcontroller 88, a communication device 90, an activation sensor 92, a pump position sensor 94, and a bottle detector 96, each of which have the same structure and function as in the first embodiment of the invention shown in FIGS. 1 to 10 and described above. The activation sensor 92 and the pump position sensor 94 are positioned adjacent to a rear edge 98 of the top wall 70 of the nozzle shield 40, as in the first embodiment shown in FIGS. 1 to 10. The upper cover portion 130 and the lower cover portion 132 are preferably formed from a material that is transparent to infrared radiation, so that infrared radiation emitted by the light emitter 118 or the bottle detector 96, or detected by the light sensor 120 or the bottle detector 96, can pass through the upper cover portion 130 and the lower cover portion 132.

Figure 15:
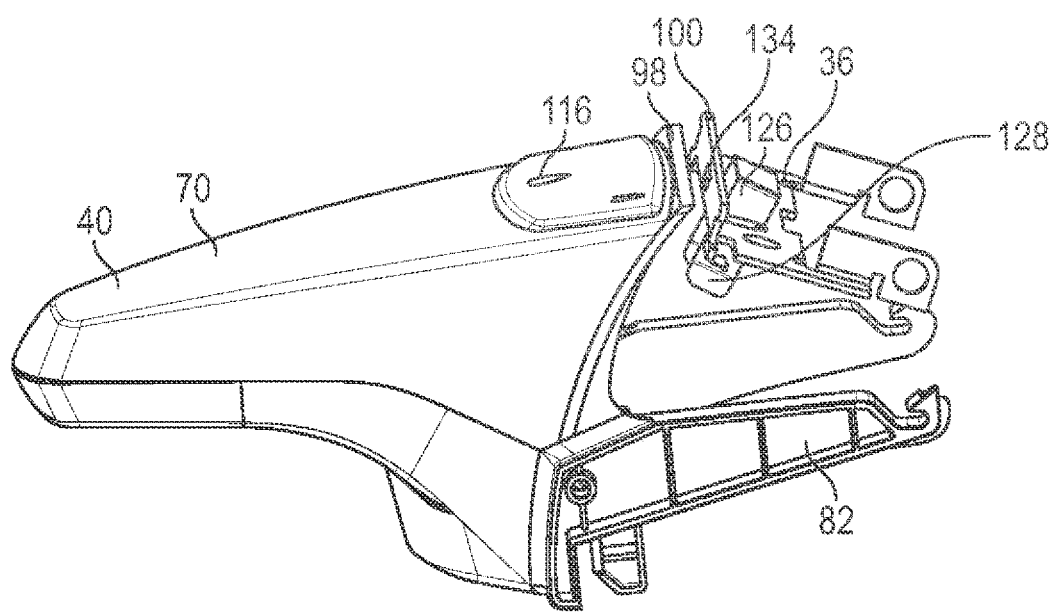
FIG. 15 is a schematic pictorial view showing for the dispenser of FIG. 11, in the position of FIG. 12, merely the nozzle shield and the actuator plate of the lever assembly.

The relative position of the lever bridge plate 36 and the nozzle shield 40 when the lever bridge plate 36 is at an upper raised position is best shown in FIG. 15. As can be seen in FIG. 15, when the lever bridge plate 36 is at the upper raised position, the front face 100 of the lever bridge plate 36 is positioned immediately adjacent to the rear edge 98 of the top wall 70 of the nozzle shield 40, with the front face 100 being substantially perpendicular to the top wall 70. To more clearly show the relative position of the lever bridge plate 36 and the nozzle shield 40, the magnet 102 is omitted from FIG. 15. The magnet 102 attaches to the front face 100 of the lever bridge plate 36 at the central opening 134 shown in FIG. 15, so that the magnet 102 is immediately adjacent to the rear edge 98 of the top wall 70 of the nozzle shield 40 when the lever bridge plate 36 is at the upper raised position.

As in the first embodiment of the invention shown in FIGS. 1 to 10, in the second embodiment of the invention shown in FIGS. 11 to 16 the dispenser 10 is activated by manually depressing the lever 14. As can be seen by comparing FIGS. 12 and 13, when the lever 14 is manually depressed, the lever 14 pivots about a lever axis 136 from the upper raised position of FIG. 12 to the lower position of FIG. 13, which displaces the lever bridge plate 36 downwardly relative to the nozzle shield 40. The downwards movement of the lever bridge plate 36 displaces the piston 62 downwardly relative to the piston chamber forming element 64, which causes an allotment of fluid 60 to be dispensed from the nozzle 16 from the bottle 56.

Figure 12:
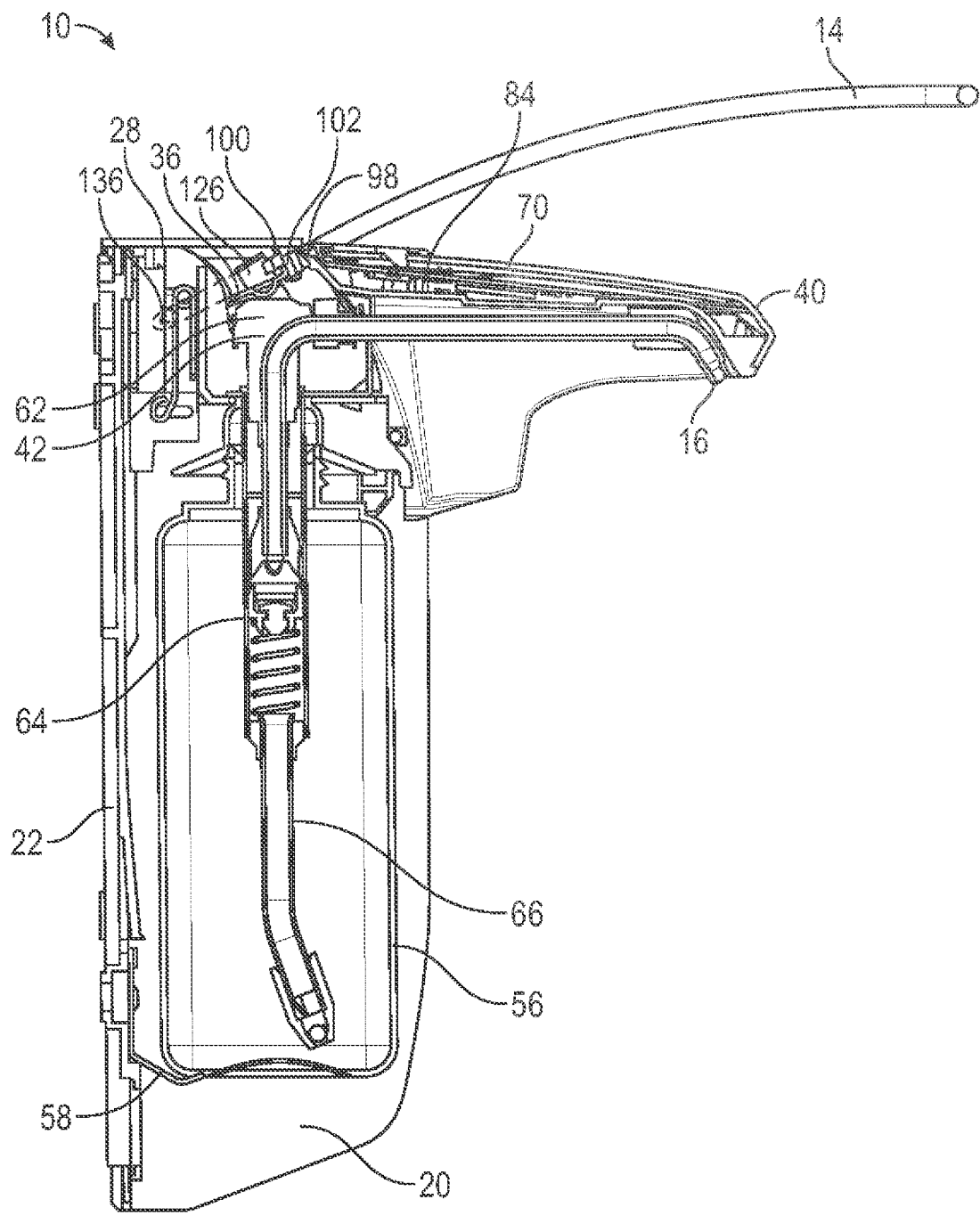
FIG. 12 is a schematic cross-sectional left side view of the dispenser of FIG. 11 with the lever assembly in an upper raised position.
Figure 13:
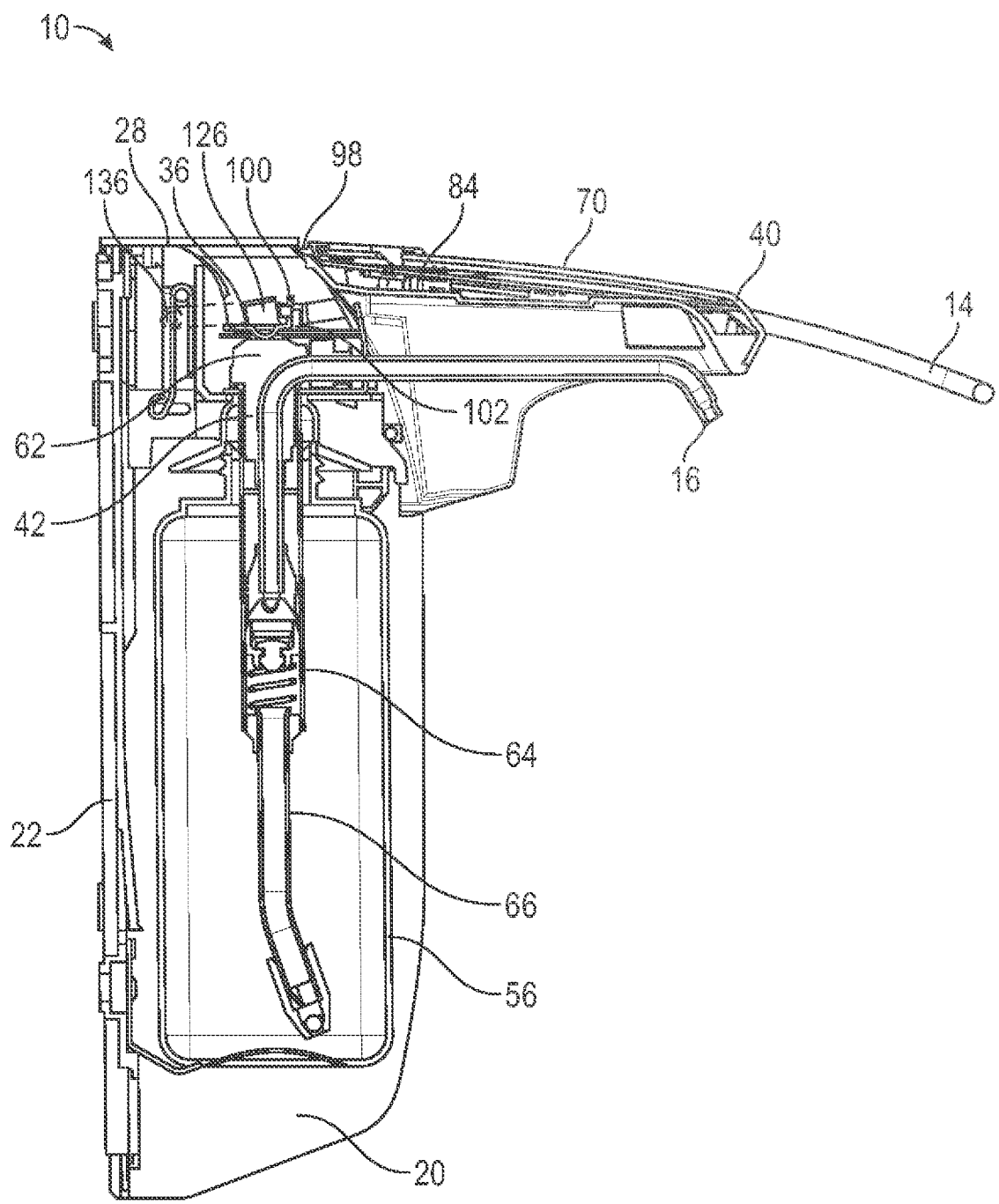
FIG. 13 is a schematic cross-sectional left side view of the dispenser of FIG. 11 the same as FIG. 12 but with the lever assembly in a lower position.

As can be seen in FIG. 13, when the lever 14 is in the lower position, the lever bridge plate 36 is spaced downwardly from the rear edge 98 of the top wall 70 of the nozzle shield 40, rather than being immediately adjacent to the rear edge 98 as in FIGS. 12 and 15. As in the first embodiment of the invention, the movement of the lever bridge plate 36 relative to the rear edge 98 of the top wall 70 of the nozzle shield 40 can be detected by the activation sensor 92. The position over time of the lever bridge plate 36 relative to the rear edge 98 of the top wall 70 of the nozzle shield 40 can also be detected by the pump position sensor 94 by detecting changes in the magnetic field of the magnet 102 as the magnet 102 moves with the lever bridge plate 36, as in the first embodiment.

The fluid dispenser 10 shown in FIGS. 11 to 16 is preferably operated in exactly the same manner as the dispenser 10 shown in FIGS. 1 to 10, with for example the microcontroller 88 controlling the various electronic components of the dispenser 10 based on the detection data from the light sensor 120, and the microcontroller 88 determining the volume of fluid 60 dispensed based on the detection data from the pump position sensor 94.

The embodiments shown in FIGS. 1 to 16 therefore provide a fluid dispenser 10 comprising: a pump mechanism 42 that dispenses fluid 60 when activated; a light sensor 120 that detects light in or around the fluid dispenser 10; and a controller 88 that controls a function of one or more electronic components of the fluid dispenser 10 based on detection data received from the light sensor 120.

The embodiments shown in FIGS. 1 to 16 also provide a smart cover 40 for a fluid dispenser 10, the smart cover 40 comprising: a light sensor 120 that detects light in or around the smart cover 40; and a controller 88 that controls a function of an electronic component of the smart cover 40 based on detection data received from the light sensor 120.

The embodiments shown in FIGS. 1 to 16 further provide a method of operating a fluid dispenser 10 comprising: detecting light in or around the fluid dispenser 10 using a light sensor 120; and controlling a function of an electronic component of the fluid dispenser 10 based on detection data received from the light sensor 120.

It will be understood that, although various features of the invention have been described with respect to one or another of the embodiments of the invention, the various features and embodiments of the invention may be combined or used in conjunction with other features and embodiments of the invention as described and illustrated herein.

The fluid dispenser 10 is not limited to the particular construction shown and described herein. Nor does the fluid dispenser 10 need to include each of the components that have been described. In some alternative embodiments, the various components of the dispenser 10 could have a different construction or could be located in a different place. The fluid dispenser 10 could also incorporate additional components besides those that have been described above. For example, the nozzle shield 40 could optionally be provided with a display screen 122, shown in dotted lines in FIG. 1, for displaying information such as the type of fluid 60 in the bottle 56, the amount of fluid 60 remaining in the bottle 56, hand hygiene information, or public health notices. The display 122 could be controlled based on the detection data received from the light sensor 120, by for example turning the display 122 off when the dispenser 10 has not been activated for a predetermined period of time. The dispenser 10 could also include one or more additional electronic components, shown schematically by reference numeral 124 in FIG. 1, whose operation is controlled or modulated based on the detection data from the light sensor 120. The additional electronic components 124 may include, for example, a motion detector, a hand detector, a timer, a counter, a fingerprint reader, a light, a magnetic sensor, a transmitter, a receiver, a communication device, a processor, a sound detector, a camera, a time-of-flight sensor, a position sensor, a proximity sensor, and/or an infrared sensor.

Preferably, the dispenser 10 includes a mechanism for lifting the piston 62 when the lever bridge plate 36 returns to the unbiased first position. Any suitable mechanism known to a person skilled in the art could be used, including for example a spring mechanism within the pump 42 biasing the piston 62 upwardly relative to the piston chamber forming element 64, or a mechanical attachment between the piston 62 and the lever bridge plate 36. The piston engagement member 126 shown in FIG. 14 is preferably used for this purpose.

The pump position sensor 94 could be configured to detect the position of any movable component of the dispenser 10 whose movement correlates to the volume of fluid 60 dispensed, and need not detect the position of the lever bridge plate 36. For example, in an alternative configuration the magnet 102 could be attached to the piston 62, and the pump position sensor 94 could detect the position of the piston 62. The mechanism for activating the pump 42 could also differ from that shown in the drawings, and for example need not include a lever 14 or a lever bridge plate 36. For example, a push button or a rotary mechanism could be used. The lever bridge plate 36 may also be referred to as an actuator plate 36 or actuator 36. The dispenser 10 could also use a different type of pump position sensor 94 than the one described. Different types of pump mechanisms 42 other than a piston pump could also be used, such as a rotary pump or a diaphragm pump.

The term "controller" as used herein may refer to a single microcontroller 88 or to a group of microcontrollers 88 and/or processors and/or other computer components that collectively perform the various calculations and control functions as described herein. In some embodiments of the invention, the controller 88 may perform additional calculations and/or control functions, or fewer calculations and/or control functions, as compared to the preferred embodiments described above.

The nozzle shield 40 could be provided separately from the rest of the dispenser 10. For example, the nozzle shield 40 could be sold as a smart nozzle shield 40 for the purpose of modifying an older existing dispenser, such as the one described in U.S. Pat. No. 7,748,573 to Anhuf et al. Replacing the previous shield with the new smart nozzle shield 40 as described herein would allow the dispenser 10 to provide the various smart functions as described herein, including calculating the amount of fluid 60 dispensed, providing an indication when the volume of fluid 60 dispensed is equal to or above a threshold volume, and transmitting data about the volume of fluid 60 dispensed or the volume of fluid 60 remaining in the bottle 56. A magnet 102 could also be attached to the lever bridge plate 36 of the older existing dispenser. The nozzle shield 40 is also referred to herein as the cover 40 or removable cover 40 or smart cover 40.

The light emitter 118 and the light sensor 120 could be positioned at different locations, and need not be positioned immediately beside each other as shown in the Figures. In some embodiments of the invention, the light emitter 118 could be omitted. In other embodiments of the invention, the light sensor 120 could be configured to detect only the light emitted by the light emitter 118, and need not be capable of detecting ambient light. Preferably, the lever bridge plate 36 presents a substantially flat, metallic surface towards the light emitter 118, so that the light emitted from the light emitter 118 is reflected off the flat, metallic surface towards the light sensor 120 when the lever bridge plate 36 is in the unbiased first position. However, other types of surfaces that are not metallic and are not flat could also be used. Optionally, the front face 100 of the lever bridge plate 36 is substantially perpendicular to the printed circuit board 84 when in the unbiased first position, so that the light emitted by the light emitter 118 is reflected back towards the printed circuit board 84. When the front face 100 of the lever bridge plate 36 pivots away from the unbiased first position, the angle of the front face 100 preferably changes so that the light emitted by the light emitter 118 is reflected away from the printed circuit board 84. In some embodiments, the activation sensor 92 may be considered a photoelectric sensor.

In one optional mode of operating the dispenser 10, the communication device 90 could be configured to communicate with a mobile device carried by a user, such as the smart watch 110 shown in dotted lines in FIG. 1. Optionally, the smart watch 110 could transmit information to the dispenser 10 about the identity of the user, and this information could be recorded for hand hygiene compliance tracking. The identity of the user could also be used to, for example, set or update the threshold volume used by the microcontroller 88. For example, in a facility where different users of the dispenser 10 have different hand hygiene protocols, such as doctors versus nurses versus cleaning staff, the threshold volume could be adjusted based on the hand hygiene protocol that applies to the specific user who is activating the dispenser 10. The volume of fluid 60 required to illuminate the indicator 116 in green would thus depend on the identity of the particular user who is interacting with the dispenser 10.

Although the fluid 18 is preferably a hand cleaning fluid, such as hand soap or hand sanitizer, the dispenser 10 could be used to dispense other fluids as well. The term "fluid" as used herein includes any flowable substance, including liquids, foams, emulsions, and dispersions.

One preferred embodiment of the invention is configured as follows:

The activation sensor 92 is an optical infrared sensor (typ. 900 nm) detecting if the lever bridge plate 36 or presser is in the unbiased first position or zero position. Normally it is roughly sampling the position of the presser, which is made from metal, with 50 samples per second by transmitting light with the LED 118 and receiving reflected light from the presser by a phototransistor of the light sensor 120. For extreme power saving this is done with very short pulses without microcontroller 88 power. If the reflection varies from the referenced value the microcontroller 88 wakes up and starts sampling the two magnetic hall-effect sensors 104 and 106 which are oriented in a 90 degree angle against each other with 250 Hz, measuring the field from the magnet 102 mounted into the presser. The software is preferably self-learning and calculates the dosage volume from the values coming from the magnetic sensors 104 and 106. When the presser is back in its zero position the microcontroller 88 stays awake and then it is referencing the reflection from the presser again and going to sleep again.

To avoid unnecessary power consumption when the smart nozzle shield 40 is not installed the mode of the zero position sensor 92 can be changed to passive. When the IR-receiver 120 is indicating darkness for more than 24 hours it is likely stored in a dark room or packaged e.g. in a cardboard box. Then the sampling with IR-LED 118 is not necessary and it is switched off. The sensor 92 then samples only the environmental brightness (no IR-LED 118, typ. 1 sample every 10 seconds) to detect if it is still being stored. If a brighter value is detected sampling with LED 118 at the normal rate is started for at least 24 hours and being retriggered by activations or by increase in brightness from very dark. To achieve this the IR-receiver 120 preferably has a wider wavelength spectrum so that it sees also the red part of environmental light (LED/halogen/fluorescent/daylight). Spectral sensitivity may for example be that of APA3010P3BT-GX as shown in FIG. 10. The activation sensor 92 may comprise for example LED WL-SISW and Phototransistor APA3010P3BT-GX. Another IR sensor with a very focused beam detects the presence of a bottle 56. When a new bottle 56 is inserted it preferably has to be full as a hygienic requirement.

To avoid empty bottles 56 and a gap in the hand hygiene the dosage volumes are deducted and the real volume in the bottle 56 is determined so that a bottle change alarm can be sent.

The two magnetic hall-effect sensors 104 and 106 may for example comprise SI7212-B-00-IVR, with results running through a complete stroke as shown in FIG. 8.

The smart nozzle shield 40 may include various possibilities for communication with the environment, such as for example: WiFi for embedding into a local network/LPWAN (Low Power Wide Area Network, e.g. NB-IoT via a carrier), both for connection with an IoT-platform (data output, FirmWare and configuration update); NFC: Near Field Communication with Smartphones (configuration, identification, data output, Firmware update); USB/UART for direct communication with a computer.

Although this disclosure has described and illustrated certain preferred embodiments of the invention, it is to be understood that the invention is not restricted to these particular embodiments. Rather, the invention includes all embodiments which are functional, optical, electrical, or mechanical equivalents of the specific embodiments and features that have been described and illustrated herein.

We claim:

1. A method of operating a fluid dispenser, the fluid dispenser comprising:
   a pump mechanism for dispensing fluid from the fluid dispenser;
   a light emitter;
   a light sensor; and
   a movable component that moves when the pump mechanism is activated;
   the method comprising:
   emitting light from the light emitter;
   detecting movement of the movable component using the light sensor by detecting changes in an amount of the light emitted by the light emitter that is reflected from the movable component towards the light sensor;
   determining whether the pump mechanism has been activated based on detection data received from the light sensor; and
   controlling a function of one or more electronic components of the fluid dispenser based on the detection data received from the light sensor;
   wherein the one or more electronic components comprises a pump position sensor, the method further comprising:
   sensing a property of the fluid dispenser that is indicative of a position of the pump mechanism using the pump position sensor.

2. The method according to claim 1, wherein controlling the function of the one or more electronic components of the fluid dispenser based on the detection data received from the light sensor comprises controlling the function of the one or more electronic components based on whether the pump mechanism has been activated.

3. The method according to claim 2,
   wherein controlling the function of the pump position sensor based on the detection data received from the light sensor comprises activating the pump position sensor when the pump mechanism has been activated;
   wherein controlling the function of the pump position sensor based on the detection data received from the light sensor comprises inactivating the pump position sensor when the pump mechanism has been inactive for a set period of time;

the method further comprising:

determining the position of the pump mechanism over time based on sensor data from the pump position sensor.

4. The method according to claim 3, further comprising calculating or estimating a volume of fluid that has been dispensed from the fluid dispenser over time based on the position of the pump mechanism over time;

comparing the volume of fluid that has been dispensed from the fluid dispenser during an activation event to a threshold volume;

determining whether the volume of fluid dispensed during the activation event exceeds the threshold volume; and providing an indication to a user when the volume of fluid dispensed during the activation event exceeds the threshold volume;

wherein the fluid dispenser further comprises a magnet that moves relative to the pump position sensor when the pump mechanism is activated;

wherein the pump position sensor comprises a first magnet sensor that is oriented in a first orientation and a second magnet sensor that is oriented in a second orientation, the first orientation being different than the second orientation;

the method further comprising detecting a position of the magnet over time using the first magnet sensor and the second magnet sensor; and wherein determining the position of the pump mechanism over time comprises determining the position of the pump mechanism over time based on the sensor data from the first magnet sensor and the second magnet sensor;

further comprising orienting the second magnet sensor at 90 degrees relative to the first magnet sensor;

wherein the fluid dispenser further comprises an actuator plate that engages with the pump mechanism to activate the pump mechanism;

wherein the magnet is attached to the actuator plate; and wherein detecting movement of the movable component using the light sensor comprises detecting light reflected from the actuator plate;

further comprising positioning a cover of the fluid dispenser adjacent to the actuator plate, the cover carrying the light sensor, the first magnet sensor, and the second magnet sensor;

wherein the fluid dispenser further comprises a data communication device that is operable to communicate with a mobile communication device carried by a user;

the method further comprising activating the data communication device when the controller determines that the pump mechanism has been activated;

further comprising setting the threshold volume or updating the threshold volume based on user data received by the data communication device from the mobile communication device;

wherein the fluid dispenser is a hand cleaning fluid dispenser for dispensing a hand cleaning fluid.

5. The method according to claim 1, wherein controlling the function of the one or more electronic components of the fluid dispenser based on the detection data received from the light sensor comprises controlling the function of the one or more electronic components based on a length of time since the pump mechanism was last activated.

6. The method according to claim 1, wherein controlling the function of the pump position sensor based on the detection data received from the light sensor comprises activating the pump position sensor when the pump mechanism has been activated.

7. The method according to claim 1, wherein controlling the function of the pump position sensor based on the detection data received from the light sensor comprises inactivating the pump position sensor when the pump mechanism has been inactive for a set period of time.

8. The method according to claim 1, further comprising determining the position of the pump mechanism over time based on sensor data from the pump position sensor.

9. The method according to claim 8, further comprising calculating or estimating a volume of fluid that has been dispensed from the fluid dispenser over time based on the position of the pump mechanism over time.

10. The method according to claim 9, further comprising:

comparing the volume of fluid that has been dispensed from the fluid dispenser during an activation event to a threshold volume; and determining whether the volume of fluid dispensed during the activation event exceeds the threshold volume.

11. The method according to claim 10, further comprising providing an indication to a user when the volume of fluid dispensed during the activation event exceeds the threshold volume.

12. The method according to claim 10, wherein the fluid dispenser further comprises a data communication device that is operable to communicate with a mobile communication device carried by a user;

the method further comprising activating the data communication device when the controller determines that the pump mechanism has been activated.

13. The method according to claim 12, further comprising setting the threshold volume or updating the threshold volume based on user data received by the data communication device from the mobile communication device.

14. The method according to claim 8, wherein the fluid dispenser further comprises a magnet that moves relative to the pump position sensor when the pump mechanism is activated;

wherein the pump position sensor comprises a first magnet sensor that is oriented in a first orientation and a second magnet sensor that is oriented in a second orientation, the first orientation being different than the second orientation;

the method further comprising detecting a position of the magnet over time using the first magnet sensor and the second magnet sensor; and wherein determining the position of the pump mechanism over time comprises determining the position of the pump mechanism over time based on the sensor data from the first magnet sensor and the second magnet sensor.

15. The method according to claim 14, further comprising orienting the second magnet sensor at 90 degrees relative to the first magnet sensor.

16. The method according to claim 14, wherein the fluid dispenser further comprises an actuator plate that engages with the pump mechanism to activate the pump mechanism;

wherein the magnet is attached to the actuator plate; and wherein detecting movement of the movable component using the light sensor comprises detecting light reflected from the actuator plate.

17. The method according to claim 16, further comprising positioning a cover of the fluid dispenser adjacent to the actuator plate, the cover carrying the light sensor, the first magnet sensor, and the second magnet sensor.

18. The method according to claim 1, wherein the fluid dispenser is a hand cleaning fluid dispenser for dispensing a hand cleaning fluid.

19. A method of operating a fluid dispenser, the fluid dispenser comprising:
- a pump mechanism for dispensing fluid from the fluid dispenser;
- a light emitter;
- a light sensor; and
- a movable component that moves when the pump mechanism is activated;

the method comprising:
- emitting light from the light emitter;
- detecting movement of the movable component using the light sensor by detecting changes in an amount of the light emitted by the light emitter that is reflected from the movable component towards the light sensor;
- determining whether the pump mechanism has been activated based on detection data received from the light sensor; and
- controlling a function of one or more electronic components of the fluid dispenser based on the detection data received from the light sensor;
- wherein controlling the function of the one or more electronic components of the fluid dispenser based on the detection data received from the light sensor comprises controlling the function of the one or more electronic components based on a length of time since the pump mechanism was last activated.

* * * * *